(12) United States Patent
Chiba et al.

(10) Patent No.: US 7,458,705 B2
(45) Date of Patent: *Dec. 2, 2008

(54) LED ILLUMINATION DEVICE

(75) Inventors: Shingo Chiba, Shizuoka (JP); Haruyuki Matsushita, Shizuoka (JP); Toshiaki Okabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/560,618

(22) PCT Filed: Jun. 9, 2004

(86) PCT No.: PCT/JP2004/008412

§ 371 (c)(1),
(2), (4) Date: Sep. 8, 2006

(87) PCT Pub. No.: WO2004/114736

PCT Pub. Date: Dec. 29, 2004

(65) Prior Publication Data

US 2007/0064450 A1    Mar. 22, 2007

(30) Foreign Application Priority Data

Jun. 20, 2003  (JP) ............................. 2003-175902
Jun. 20, 2003  (JP) ............................. 2003-176137
Oct. 20, 2003  (JP) ............................. 2003-359113

(51) Int. Cl.
F21V 29/00    (2006.01)

(52) U.S. Cl. ..................... 362/362; 362/800; 362/249

(58) Field of Classification Search ......... 362/728–736, 362/806, 807, 720–723

See application file for complete search history.

(56) References Cited

U.S. PATENT DOCUMENTS

| 4,087,696 | A |   | 5/1978 | Bull |
| 5,660,461 | A |   | 8/1997 | Ignatius et al. |
| 5,672,000 | A |   | 9/1997 | Lin |
| 6,017,241 | A |   | 1/2000 | Komai |
| 6,038,130 | A | * | 3/2000 | Boeck et al. ............. 361/735 |
| 6,422,716 | B2 |   | 7/2002 | Henrici et al. |

(Continued)

FOREIGN PATENT DOCUMENTS

DE          101 33 255 A1      1/2003

(Continued)

*Primary Examiner*—Anabel M Ton
(74) *Attorney, Agent, or Firm*—Kratz, Quintos & Hanson, LLP

(57) ABSTRACT

An LED illumination device includes LED lamp modules 34 coupled in a vertical direction. Each of said LED lamp modules 34 includes a base 12, a bus bar circuit 35 formed on the base 12, and a cover 25 connected to the base 12 to cover the bus bar circuit 35. A locking frame 14 (coupling portion) to be coupled with the upper LED lamp module 34 is formed on said base 12. A locking arm 32 (mating coupling portion) to be coupled with said locking frame 14 on the base 12 of the lower LED lamp module 34 is formed on said cover 25. Further, a guiding groove 18, into which said locking arm 34 is inserted, is formed on said base 12 near the locking frame 14, and a guiding hole 27, into which said locking frame 14 is inserted, is formed on the cover 25 near the locking arm 32.

16 Claims, 14 Drawing Sheets

U.S. PATENT DOCUMENTS

| | | | |
|---|---|---|---|
| 6,994,455 B2 * | 2/2006 | Okabe et al. | 362/362 |
| 2001/0007526 A1 | 7/2001 | Ohkohdo et al. | |

FOREIGN PATENT DOCUMENTS

| | | |
|---|---|---|
| EP | 1 039 214 A2 | 9/2000 |
| EP | 1 178 706 A2 | 2/2002 |
| EP | 1 289 341 A2 | 3/2003 |
| WO | WO 98/38613 A1 | 9/1998 |

* cited by examiner

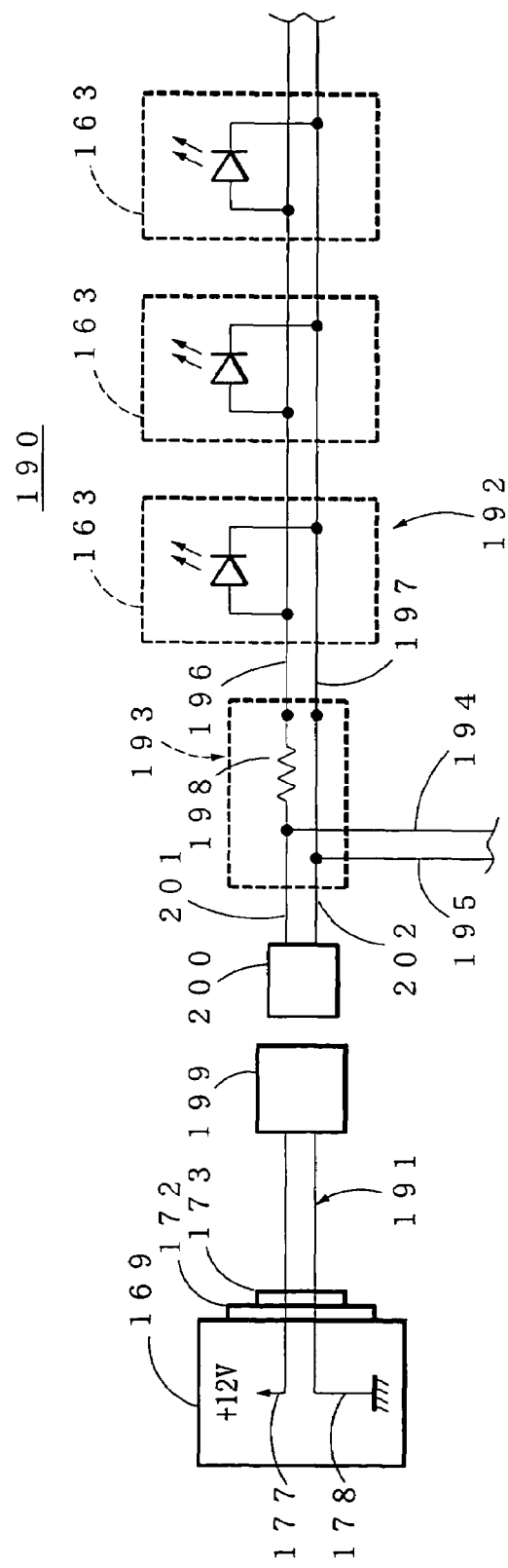
FIG. 15
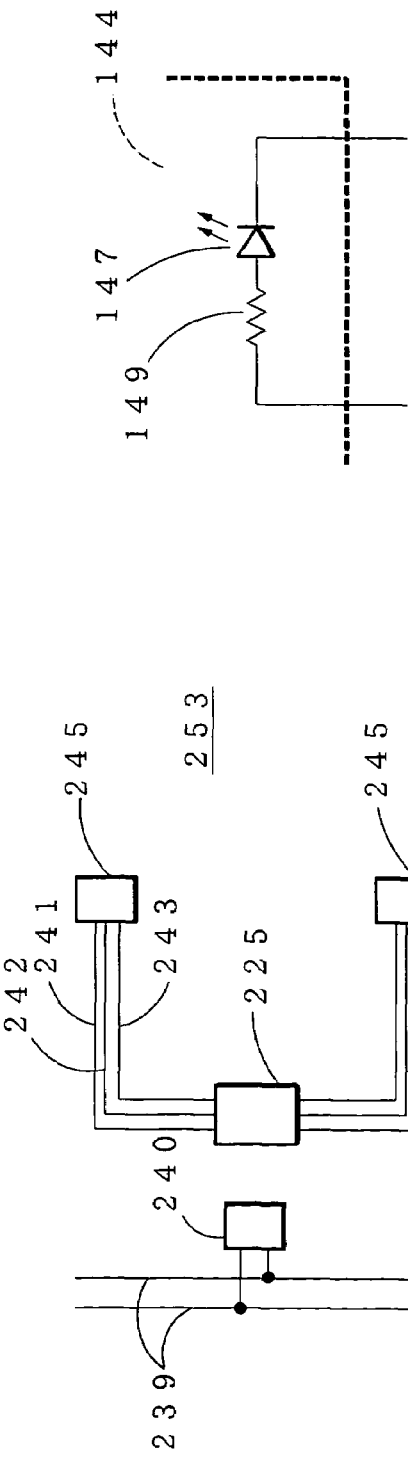
FIG. 23
FIG. 17

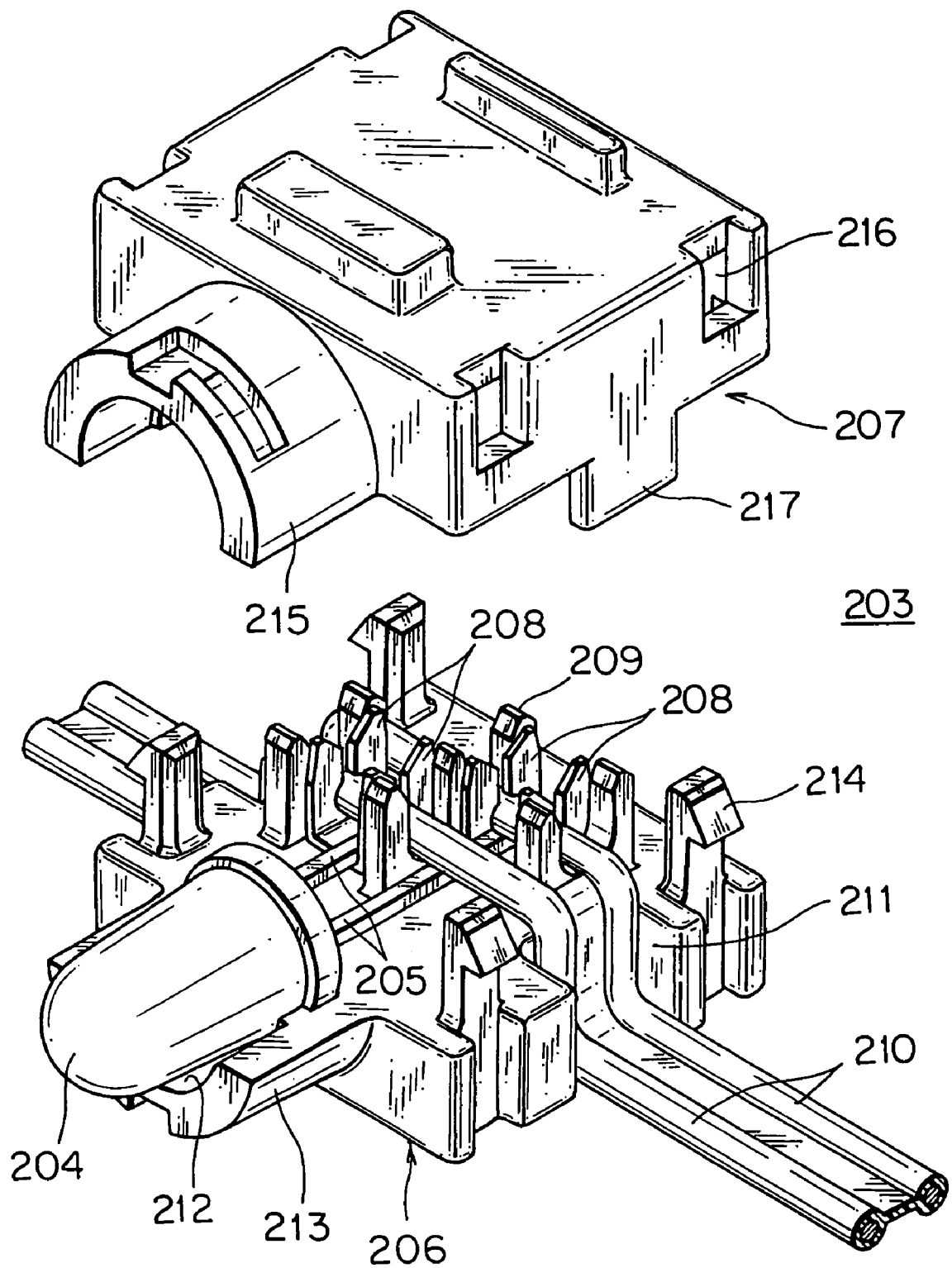
F I G. 19

LED ILLUMINATION DEVICE

TECHNICAL FIELD

This invention relates to a compact LED illuminating device being used for an interior roof lamp, a map lamp and the like in a vehicle for purposes of illuminating an interior of the vehicle, illuminating interior of small containers, such as a console box, a glove box, a handy pocket or an ash tray, or illuminating a cup holder, or a floor of the vehicle.

Further, this invention also relates to an LED lamp module with the use of LED, and a lamp module assembly having more than one LED lamp module connected to electric wires.

BACKGROUND ART

FIG. 7 shows one embodiment of a conventional illuminating device. (Patent Document 1)

This illuminating device 50 continually illuminates interiors of an ash tray 51 and a console box 53, characterized in that an illuminating lamp 56 is arranged at a position where the ash tray 51 being pulled out is prevented from blocking light path from the illuminating lamp 56.

The ash tray 51 is arranged over the console box 53 to be engaged slidably with an ash tray holder 52 having a front opening and a lower opening. A lamp case 55, in which an illuminating lamp 56 is embedded, is attached to an upper wall 52a of the ash tray holder 52, arranged at a right end and a center in a back and forth direction of the ash tray holder 52. Further, a lighting window 52b is formed on the upper wall 52a to pass the light of the illuminating lamp 56 therethrough.

The lamp case 55 is projected from the right side of the ash tray holder 52 upwardly, and the light from the illuminating lamp 56 illuminates downward an interior of the console box 53 through the lower opening of the lamp case 55. Further, a reflector 57 extending downward is formed on the projecting portion of the lamp case 55, so that the light from the illuminating lamp 56 is reflected by the reflector 57 to illuminate the interior of the console box 53 widely.

According to this structure, since the lamp case 55 is projected rightward from, and centered in the ash tray holder 52, even if the ash tray 51 is pulled out from the ash tray holder 52, the ash tray 51 can be illuminated, and the console box 53 can be illuminated simultaneously.

FIG. 8 shows a second embodiment of the conventional illumination device (Patent Document 2). This embodiment provides an illumination device 60 to illuminate an interior of a console box 66 suitably brightly at low power consumption, comprising a lamp body 61, a substrate 63 attached to the lamp body 61, and a lens 65 covering the substrate 63.

The lamp body 61 is made of synthetic resin in a box-like shape as a whole. An attaching part 62 to attach the illumination device 60 to a wall surface of the console box 66 is provided at a lower part of the lamp body 61. The substrate 63 and the lens 65 are respectively fixed on the lamp body 61 by fixing means.

A plurality of LED chips 64 are mounted on the substrate 63. The LED chips 64 are arranged in a line, namely, a light source has a line shape. Electronic parts, such as a rectifier diode for preventing noise and current limiting resistor, are also mounted on the substrate 63.

The lens 65 is made of optically transparent synthetic resin in a box-like shape. Therefore, the console box 66 is illuminated widely by light being emitted from the LED chips 64 and passing through the lens 65.

According to above structure, since many LED chips 64 are mounted, the interior of the glove compartment can be illuminated sufficiently brightly and the illumination device 60 with low power consumption can be provided.

FIG. 9 shows a third embodiment of the conventional illumination device. This embodiment, like first and second embodiments described above, provides an illumination device 70 having LED chips, and being attached to the small container such as the console box or the grove box. The illumination device 70 is connected to a wire harness 75 arranged in a vehicle, through a joint connector 71, a branch line 72, and a module connector 73 at a module side.

When installing an additional illumination device 70, the joint connector 71, the branch line 72, and the module connector 73 are newly prepared and arranged along the wire harness 75 in a same manner as other illumination devices 70.

However, these first to third embodiments have problems below. In the first embodiment, since the light of the illuminating lamp 56 is diffused light and its intensity is high, there is a problem that the light leaks to outside of the console box 53. Further, if the illuminating lamp 56 is an incandescent lamp, there is another problem that such a lump has a short life because of its high power consumption and high heating value.

The second embodiment comprises the LED chips 64 as a light source to solve the problem of the first embodiment, however, there is a problem below.

In this embodiment, since the LED chips 64 are mounted on the substrate 63, the lamp body 61 becomes large and cannot be attached to the small container having a small space. For example, the lamp body 61 cannot be attached to such as an ash tray or a cup holder. If narrowing gaps between the LED chips 64 for miniaturizing the illumination device 60, there is a problem that heat radiation efficiency of the illumination device 60 is reduced, a temperature of an inside of the illumination device 60 is increased, and luminous efficiency is reduced. Particularly luminous efficiency of a red LED chip falls rapidly with increasing temperature.

When the illumination device 60 is used for a small container such as an ash tray or a cup holder, since high illumination is not needed, a small number of the LED chips 64 is enough for the illumination device 60 to have, while when the illumination device 60 is used for a console box, a glove box or a map light, since high illumination is needed, the illumination device 60 needs to have a large number of the LED chips 64. Thus, the required number of the LED chips 64 differs according to a size of the small containers or a place to be illuminated. However, there is a problem that said illumination device 60 cannot flexibly adapt to an increase or a decrease in the number of the LED chips 64, so that the lamp body 61, the substrate 63, and the lens 65 should be reformed and a total cost, including a cost for metal molds, increases.

The third embodiment comprises the LED chips 64 as the light source like the second embodiment, however, there is a problem below.

In this embodiment, the illumination device 70 cannot be miniaturized, because the illumination device 70 is connected to the branch line 72. Further, since the illumination device 70 is connected to the wire harness 75 through the joint connector 71, the branch line 72, and the module connector 73, there is a problem that the number of the parts is large and a total cost increases. Further, it is troublesome and time-consuming to install an additional illumination device 70.

Heretofore, there is proposed for use in an interior illumination in a vehicle that a lamp module is formed by individual light emitters such as lamps (bulbs) or LEDs.

In this case, for example, when a plurality of light emitters are arranged in parallel for increasing intensity of the illumination, a lamp module assembly 150 is formed, as shown in FIG. 22, by providing a plurality of junction connectors 142 in series in the middle of a wire harness (trunk line) 141, branching branch harnesses 143 from the junction connectors 142, and at each branch harness 143, a connector 145 connecting a lamp module 144 to said branch harness 143.

Each lamp module 144 includes a case 146 made of synthetic resin, a light emitter 147 received by the case 146, and a lead terminal 148 connected to the light emitter 147. By connecting the lead terminal 148 to a female terminal (not shown) in the connector 145, the branch harnesses 143 and the light emitter 147 are connected together. When being a female terminal, the lead terminal 148 is connected to a male terminal in the connector 145.

When an LED (light emitting diode) is used for the light emitter 147, a resistor 149 is provided in the lamp module 144 for reducing voltage. The resistor 149 is electrically connected between the positive lead terminal and light emitter 147. FIG. 23 shows one embodiment of an equivalent circuit having the resistor 149 and the light emitter 147 in the lamp module 144.

For example, while a vehicle battery voltage is 12 volts, a rated voltage of an LED is 3.5 volts. Therefore, the battery voltage should be reduced to 3.5 volts. Apart from the resistor 49, a semiconductor element such as a diode is often provided for protecting the LED 147 from static electricity and the like.

In addition to the above described art, for example, Patent Document 3 discloses a structure, in which a plurality of chip type LEDs as light emitters are arranged in parallel in one lamp module.

Since the LED consumes low electric power, and has a small size, the LED allows to be used for a continuous illumination, and allows the lamp module to be miniaturized.

However, it is preferable that the number of the light emitters is set properly according to a place in which the lamp module is used, and according to required intensity. From this point of view, the later lamp module having a plurality of light emitters as described in Patent Document 3 is inadequate.

However, there is a problem that, for arranging the suitable number of the lamp modules shown in FIG. 22 with branch wires, each of which having one light emitter, many parts such as junction connectors 142, branch harnesses 143 and the connectors 145 are required. Further, the lamp module assembly requires a complex, upsized and high-cost structure. Further, many man-hours are required to assemble and connect the lamp module assembly.

Patent Document 4 discloses a structure for arranging a plurality of LEDs connected to two electric wires without any branch wires, wherein an LED chip is molded into a plastic bulb, and connected respectively to two lead parts with bonding wires. Then, pressure contact terminals continued integrally to the lead parts are pressed into contact with the electric wires in a lamp holder made of synthetic resin.

However, in the LED lamp module described in Patent Document 4, since it is necessary to connect the LED chip to respective lead terminals with thin bonding wires, workers should pay close attention to said bonding. Further, an assembly operation of said LED lamp module requires a lot of man-hours and a severe quality control. Further, after being inserted into the holder, the pressure contact terminal is pressed into contact with the electric wire. Therefore, its workability may be low when the numbers of the pressure contact terminals to be in contact with electric wires is large.

Further, as a Lamp module assembly 150 shown in FIG. 22, when the resistor 149 is arranged in a case of each LED lamp module 144, said LED lamp module becomes large. Further, the number of the components of resistors 149 is increased to increase components cost. Further, the Lamp module assembly 150 becomes large to need a larger space to be mounted in a vehicle. Further, a production cost of the Lamp module assembly 50 becomes higher.

[Patent Document 1]
Japanese Utility Model Application Laid-Open No. Hei 6-1476 (Page 2, FIG. 1)
[Patent Document 1]
Japanese Utility Model Application Laid-Open No. Hei 9-272377 (Pages 2 to 4, FIG. 1)
[Patent Document 3]
Japanese Patent Application Laid-Open No. Hei 09-272377 (Pages 3 to 4, FIGS. 1 and 5)
[Patent Document 4]
Japanese Patent Application Laid-Open No. Hei 11-121807 (Pages 4 to 5, FIGS. 1 to 3)

DISCLOSURE OF INVENTION

In view of above described problems, an object of this invention is to provide an LED illumination device, which can be easily extended more, miniaturized and standardized to increase design flexibility, and can prevent reliably a cover from removing from a base thereof.

Further, in view of problems described above, another object of this invention is to provide an LED lamp module and a lamp module assembly formed by assembling said LED lamp modules, which can be easily set the proper number of the light emitters as needed, and can be easily and efficiently assembled with a fewer man-hours at lower cost. Further, said LED lamp module and Lamp module assembly can be prevented from being enlarged and at higher cost as the number of the resistors to be arranged is increased. In summary, the object of this invention is to provide low-cost high-practical LED lamp module and lamp module assembly.

In order to attain said object, according to this invention as described in claim 1, there is provided an LED illumination device comprising LED lamp modules coupled in a vertical direction, each LED lamp module comprising:

a base;

a conductive circuit formed on the base; and a cover to be attached to the base to cover the conductive circuit, whereby a coupling portion is formed on said base to be coupled with the cover of the LED lamp module located at the upper side thereof, and a mating coupling portion is formed on said cover to be coupled with the coupling portion of the base of the LED lamp module located at the lower side thereof.

According to this structure, the coupling portion on the base of the lower LED lamp module is coupled with the mating coupling portion of the upper LED lamp module to couple a plurality of LED lamp modules in a vertical direction. Therefore, intensity of illumination can be adjusted suitably by increasing or decreasing the number of the coupled LED lamp modules.

Further, according to this invention as described in claim 2, there is provided the LED illumination device as described in claim 1, wherein said coupling portion is a locking frame projecting upward, and said mating coupling portion is a locking arm having a hook at its distal end and projecting downward to be engaged with said locking frame, wherein one guide, into which said locking arm is inserted, is formed on said base near the locking frame, and the other guide, into which said locking frame is inserted, is formed on the cover near the locking arm.

According to this structure, firstly, at each LED lamp module, the locking frame is inserted through the guiding part of the cover to expose its distal end, secondly, at each LED lamp module, the locking arm is protruded downward through the guiding part of the base, then, the locking arm of the upper LED lamp module is engaged with the locking frame of the lower LED lamp module to couple the upper and lower LED lamp modules together.

For decoupling these modules from each other, while the locking arm of the upper LED lamp module is bent outward, the upper and lower LED lamp modules are removed from each other. Thus, the upper locking arm and the lower frame are disengaged with each other to separate the upper and lower LED lamp modules.

Further, according to this invention as described in claim 3, there is provided the LED illumination device as described in claim 2, wherein said locking frame is curved inward.

According to this structure, since the locking frame is curved inward, when one LED lamp module is assembled, the locking frame may not block the locking arm to prevent the locking frame and the locking arm from interfering with each other.

Further, according to this invention as described in claim 4, there is provided the LED illumination device as described in claim 3, wherein a guide rib is formed on a ceiling wall of the cover to straighten the curved locking frame when coupling the cover and the base to each other.

According to this structure, when coupling the cover to the base, the guide rib straightens upward the curved locking frame.

Further, according to this invention as described in claim 5, there is provided the LED illumination device as described in any one of claims 1 to 4, wherein a locking part for locking the coupled cover is formed on the base, and a mating locking part is formed on the cover to be engaged with said locking part.

According to the above structure, by engaging between the coupling portion and the mating coupling portion, and engaging between the locking part and the mating locking part, the cover is doubly prevented from uncovering the base. Thus, electronic parts, such as LED chips or current regulation diodes, are reliably protected from outside interference.

Further, according to this invention as described in claim 6, there is provided an LED lamp module comprising:

an insulating case having a base and a cover;

a conductive circuit provided at said base;

an LED mounted on the base and electrically connected to the conductive circuit;

electric wire joints provided respectively upstream and downstream of the conductive circuit.

According to this structure, the conductive circuit, the electric wire joint, and the chip type or bulb type LED can be surface-mounted on the base from above efficiently and reliably by such as an automatic machine. The LED also can be previously mounted on the conductive circuit. The electric wire joint can be formed integrally with the conductive circuit.

After the cover is attached to the base, a light emitting part of the LED illuminates an outside through such as a window of the case, or the LED is exposed to illuminate the outside directly. The positive electrode of the conductive circuit is connected to the positive electric wire, and the negative electrode of the conductive circuit is connected to the negative electric wire. These wires can be reliably surface-mounted from above to be electrically connected to the electric wire joints continued to the conductive circuit, while the cover being open. Namely, the wire is connected by pressure contact, crimping, or welding. The electric wires are connected to the electric joints in the case and, for example, led outside from both sides of the case to traverse the case. Jointing positions, where the electric wires and the electric wire joints are connected together in the case, are safely prevented from outer interference by closing the cover. The conductive circuits and the LEDs can be mounted by not only surface-mounting, but manual assembling by workers on the base.

Further, according to this invention as described in claim 7, there is provided the LED lamp module as described in claim 6, wherein said conductive circuit is a bus bar or a lead terminal.

According to this structure, the bus bar or the lead terminal can be efficiently and reliably surface-mounted from above on the base of the case. Regarding the bus bar, the chip type or a bullet type LED is mainly surface-mounted on the bus bar. The LED can be previously mounted on the bus bar. Even a thin or slim bus bar can adapt to high current and intensity LED. The bus bar or the lead terminal can be mounted by not only surface-mounting, but manual assembling by workers on the base.

Further, according to this invention as described in claim 8, there is provided the LED lamp module as described in claims 6 or 7, wherein said electric wire joint is a pressure contact terminal.

According to this structure, insulating coating electric wire is easily connected to the LED through the bus bar or the lead terminal conductor by pressure contacting the wire and the terminal together, without stripping the insulating coating wire. The pressure contact terminal can be integrally formed with the bus bar or the lead terminal.

Further, according to this invention as described in claim 9, there is provided a lamp module assembly comprising a plurality of said LED lamp modules as described in any one of claims 6 to 8, wherein electric wires are directly connected to respective electric wire joints of the LED lamp modules without any branch wires.

According to this structure, according to a specification of such as intensity, specific intensity can be attained by increasing and decreasing the number of the modules. By connecting the same type LED lamp modules in line to the electric wire, the number of the LED lamp modules can be easily increased with keeping the assembly compact.

Further, according to this invention as described in claim 10, there is provided the LED illumination device as described in any one of claims 1 to 4, wherein a locking part for locking the cover to be coupled is formed on the base, and a mating locking part is formed on the cover to be engaged with said locking part.

According to this structure, a plurality of LED lamp modules are directly connected without any branch wires to the electric wire wired to the junction box or the junction connector.

For example, the junction box is connected to a power source, and the junction connector is connected to the junction box. By arranging, for example, one resistor in the junction box or the junction connector, voltages applied to the LEDs in the LED lamp modules can be reduced from the power source voltage all together, so that the resistor for reducing voltage arranged at each LED lamp module becomes unnecessary. Therefore, the LED lamp module can be miniaturized at lower cost. Instead of the resistor, a three-terminal regulator or a DC/DC converter can be used for reducing voltage.

Further, according to this invention as described in claim 11, there is provided the lamp module assembly as described in claim 9, wherein said electric wires are wired to a junction box, a junction connector or other circuits through an electrical connector; and an electric component is provided on said electrical connector for reducing voltage applied to said LED lamp modules.

According to this structure, a plurality of LED lamp modules are directly connected wire without branch wires to the electric wire wired to the junction box, junction connector or other circuits. By arranging, for example, a resistor in the connector to reduce voltage supplied to LED lamp modules all together from power source voltage, resistors in the LED lamp modules become unnecessary. Therefore, the LED lamp module can be miniaturized at lower cost. Instead of the resistor, a three terminal regulator or a DC/DC converter can be used for reducing voltage.

Further, according to this invention as described in claim 12, there is provided the LED lamp module as described in claim 6, wherein said conductive circuit is a bus bar or a lead terminal.

According to this structure, a plurality of LED lamp modules are directly connected wire without branch wires to the electric wire wired to the junction box, junction connector or other circuits.

For example, the junction box is connected to the power source, and the junction connector is connected to the junction box. By arranging, for example, a resistor in the junction box or the junction connector to reduce voltage supplied to LED lamp modules all together from power source voltage, resistors in the LED lamp modules become unnecessary. Therefore, the LED lamp module can be miniaturized at lower cost. Instead of the resistor, a three terminal regulator or a DC/DC converter can be used for reducing voltage.

Further, according to this invention as described in claim 13, there is provided a lamp module assembly comprising:

a plurality of LED lamp modules;

electric wires connected directly to the lamp module assembly without any branch wires;

an electrical connector, through which said electric wires being wired to a junction box, a junction connector, or other circuits; and an electric component provided on said electrical connector for reducing voltage applied to said LED lamp modules.

According to this structure, a plurality of LED lamp modules are directly connected wire without branch wires to the electric wire wired to the junction box, junction connector or other circuits By arranging, for example, a resistor in the connector to reduce voltage supplied to LED lamp modules all together from power source voltage, resistors in the LED lamp modules become unnecessary. Therefore, the LED lamp module can be miniaturized at lower cost. Instead of the resistor, a three terminal regulator or a DC/DC converter can be used for reducing voltage.

Further, according to this invention as described in claim 14, there is provided the lamp module assembly as described in claim 11 or claim 13, wherein said electrical connector includes a base and a cover, said base having a bus bar with connector terminals and said electric component for reducing applied voltage, said bus bar being connected to electric wires.

According to this structure, the bus bar and a voltage reducing component such as a resistor are easily mounted on the connector base, while the cover is open. By closing the cover, the bus bar and the resistor are insulated and protected in the connector. A power supply circuit is connected to the terminals of the connector. A power supply voltage is reduced by the resistor in the connector and supplied to the electric wires, to which the LED lamp modules are connected, through the bus bar.

Further, according to this invention as described in claim 15, there is provided the lamp module assembly as described in claim 14, wherein one terminal of said component for reducing applied voltage is connected to an upstream part of said bus bar, the other terminal of said component is connected to an anode of a voltage source, and a downstream part of said bus bar is connected to a ground of the voltage source.

According to this structure, the electric wires for supplying power source supplies the power to such as a bulb lamp except the LED lamp. Thus, a lamp module specification is diversified.

BRIEF DESCRIPTION OF THE DRAWINGS

FIG. 15 is a circuit diagram showing another embodiment of the lamp module assembly.

FIG. 17 is an explanatory view showing a schematic circuit diagram of the embodiment using the connector shown in FIG. 16.

FIG. 19 is an exploded perspective view showing another embodiment of the LED lamp module according to this invention.

FIG. 23 is an explanatory view showing a circuit diagram of a conventional LED lamp module.

BEST MODE FOR CARRYING OUT THE INVENTION

Figure 1:
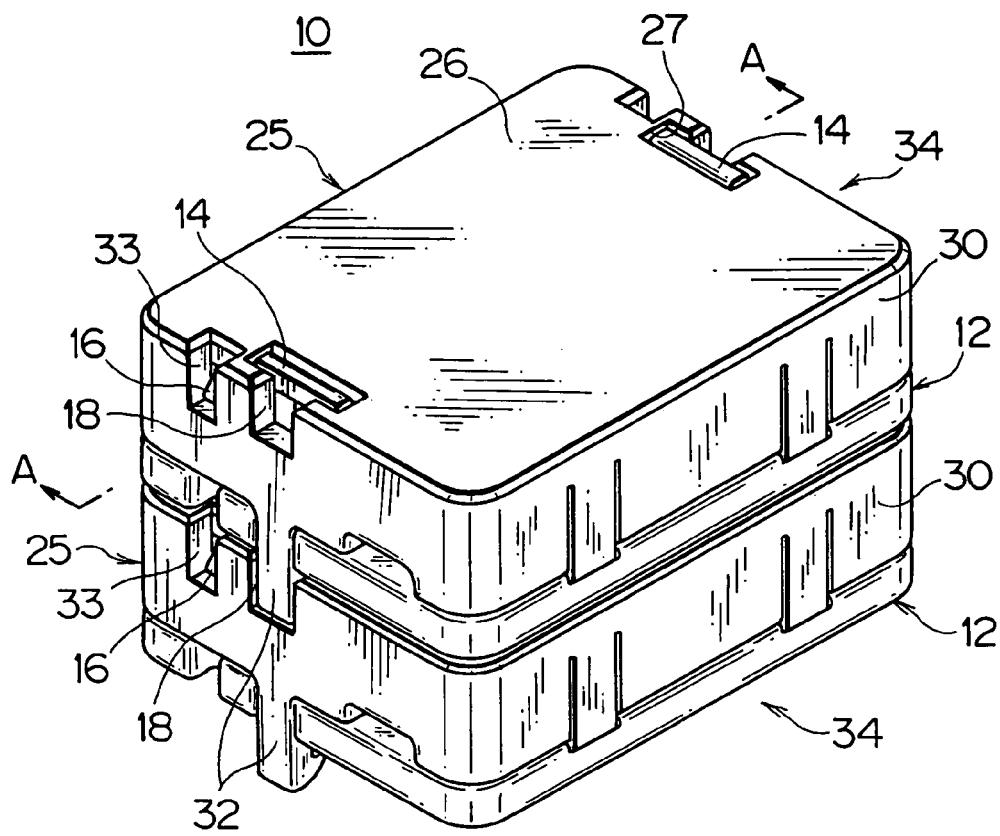
FIG. 1 is a perspective view showing one embodiment of an LED illumination device according to this invention.
Figure 2:
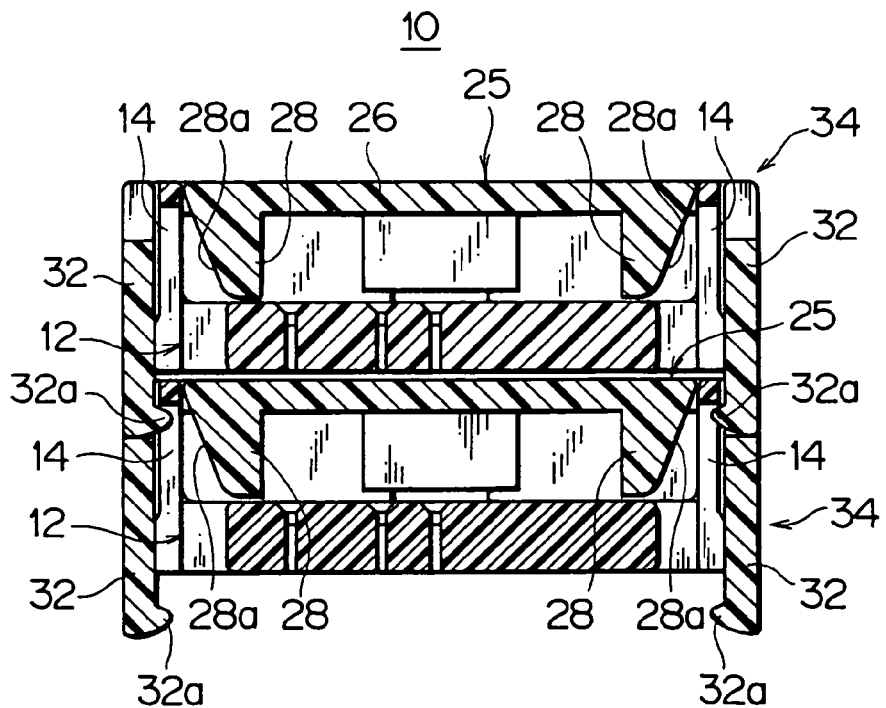
FIG. 2 is a section view of the LED illumination device taken on line A-A in FIG. 1.

In the following, the present invention will be explained with reference to the attached drawings.

FIGS. 1 to 6 show one embodiment of an LED illumination device according to this invention.

The LED illumination device 10 is formed by lower and upper LED lamp modules 34 coupling together, used for an interior roof lamp, a map lamp and the like in a vehicle for purposes of illuminating an interior of the vehicle, illuminating interior of small containers, such as a console box, a glove box, a handy pocket or an ash tray, or illuminating a cup holder, or a floor of the vehicle.

The LED illumination device 10 can be easily extended more, miniaturized, standardized, and prevent reliably a cover 25 from uncovering a base 12.

The LED illumination device 10 is firstly characterized by the followings. The LED illumination device 10 is formed by coupling LED lamp modules 34 in a vertical direction. Said LED lamp module 34 comprises the base 12, a bus bar circuit 35 formed on the base 12 with a light source LED chip (LED) 38, and the cover 25 coupled with the base 12, said cover 25 covering the bus bar circuit 35.

A locking frame (coupling portion) 14 for engaging with the cover 25 of the upper LED lamp module 34 and a locking hook (locking part) 16 for engaging with the upper cover 25 are formed on the base 12.

A locking arm (mating coupling portion) 32 for engaging with the locking frame 14 of the lower base 12 of the lower LED lamp module 34 and a locking groove (mating locking part) 33 for engaging with the locking hook 16 of the upper mating base are formed on said upper cover 25.

Further, a guiding groove (guide) 18, which the locking arm 32 enters, is formed near the locking frame 14.

A guiding hole (guide) 27, which the locking frame 14 enters, is formed near the locking arm 32 on the cover 25.

Further, the LED illumination device 10 is secondly characterized by that the upward projecting locking frame 14 is formed to be curved inward, and a guide rib 28 is formed on a ceiling wall 26 of the cover 25 for straightening the curved locking frame 14 as the cover 25 and the base 12 are coupled together.

Figure 3:
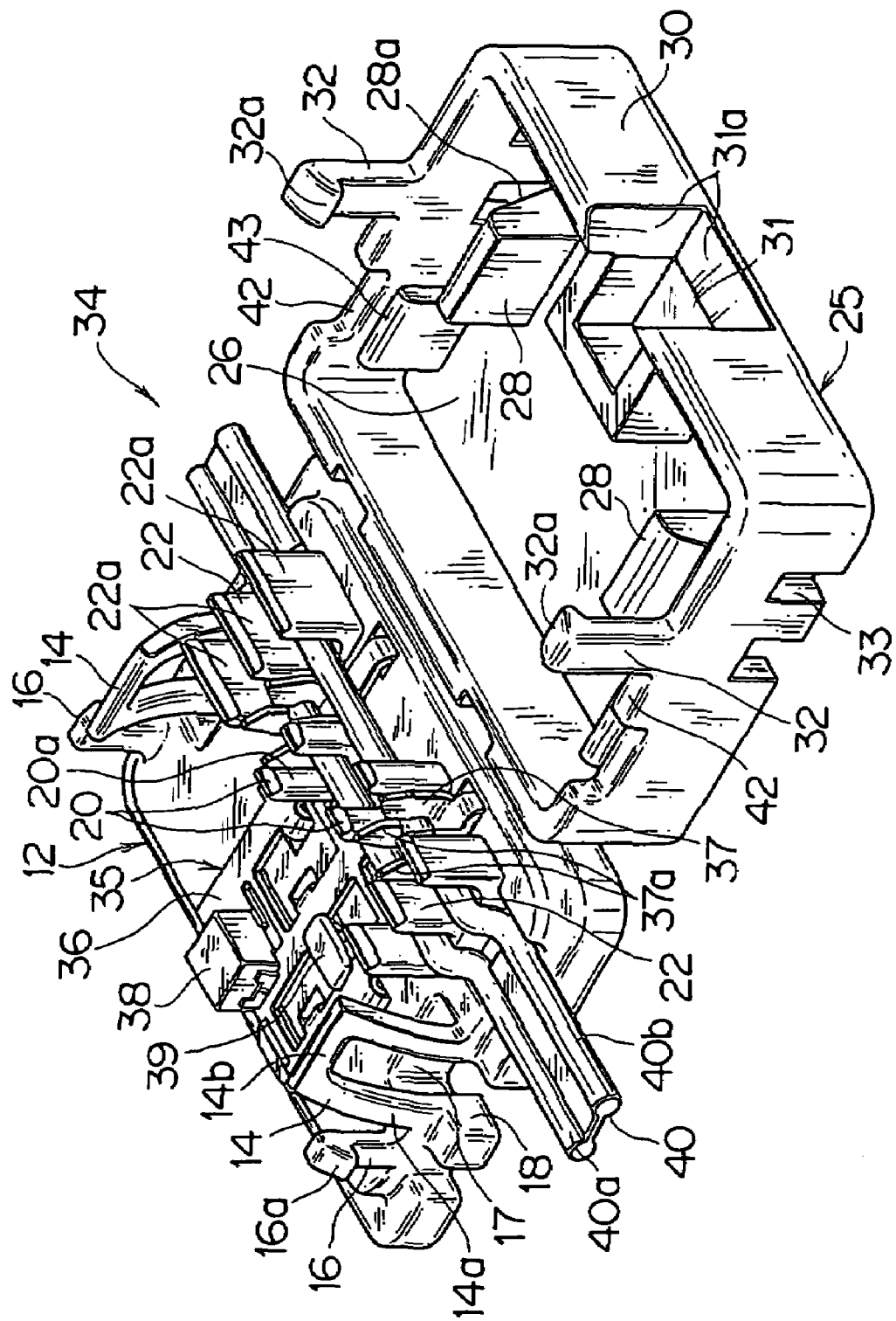
FIG. 3 is an exploded perspective view of the LED lamp module of an LED illumination device.
Figure 4:
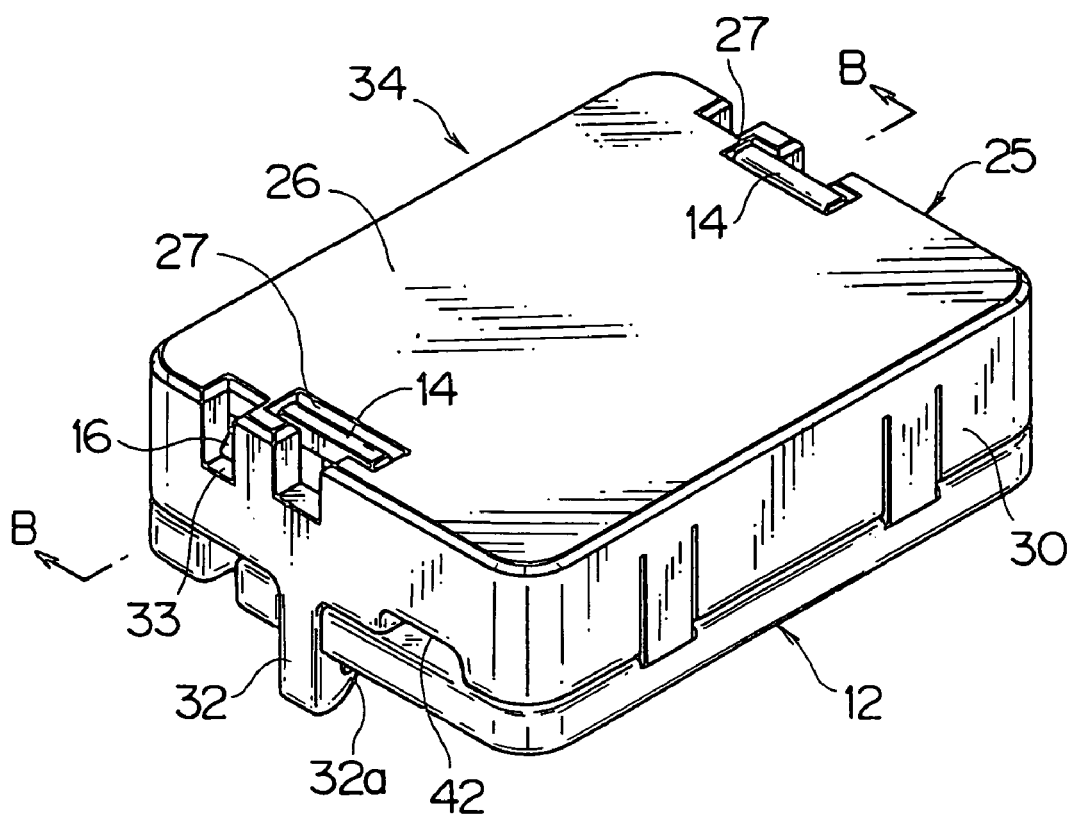
FIG. 4 is a perspective assembly view of the LED lamp module in FIG. 3.

Main components of the LED illumination device 10 and functions of the main components will be explained in detail below with reference to FIG. 3 showing mainly one set of LED lamp modules 34.

The one set of the LED lamp modules 34 includes the base 12, the bus bar circuit 35, on which the LED chip 38 is mounted, and the cover 25. The base 12 is made of insulating synthetic resin, having a rectangular plate shape. There are formed the locking hooks 16, the locking frame 14, a reinforcing rib 20 for a reinforcing pressure contact part, a guiding portion 22 for guiding an electric wire, and the like, on an upper surface of the base 12. In addition, the base 12 is not limited to be made of synthetic resin, and can be made of other insulating and moldable material such as silicon rubber, or ceramic.

The locking hooks 16 respectively stand at positions corresponding to locking grooves 33 of the cover 25, on front and back of the base, each of the locking hook 16 having a hook part 16a at its distal end. By engaging the locking hooks 16 with the locking grooves 33, the base 12 and the cover 25 are coupled and prevented from being decoupled unintentionally.

The locking frame 14 includes a base part 14a near the base 12 and a free end 14b at its distal end, being arranged near the locking hook 16, and having a shape of an inverted U hook. These locking frames 14 are arranged at positions corresponding to the locking arms 32 (FIGS. 1, 2) of the cover 25 of the upper LED lamp module 34. By engaging the locking frames 14 with the locking arms 32, the upper and lower LED lamp modules 34 are coupled together vertically.

The cover 25 of the coupled LED lamp modules 34 is double locked by a locking means having the locking hooks 16 and the locking grooves 33, and a coupling means having the locking frames 14 and the locking arms 32 to prevent reliably the cover 25 from removing from the base 12.

Figure 5:
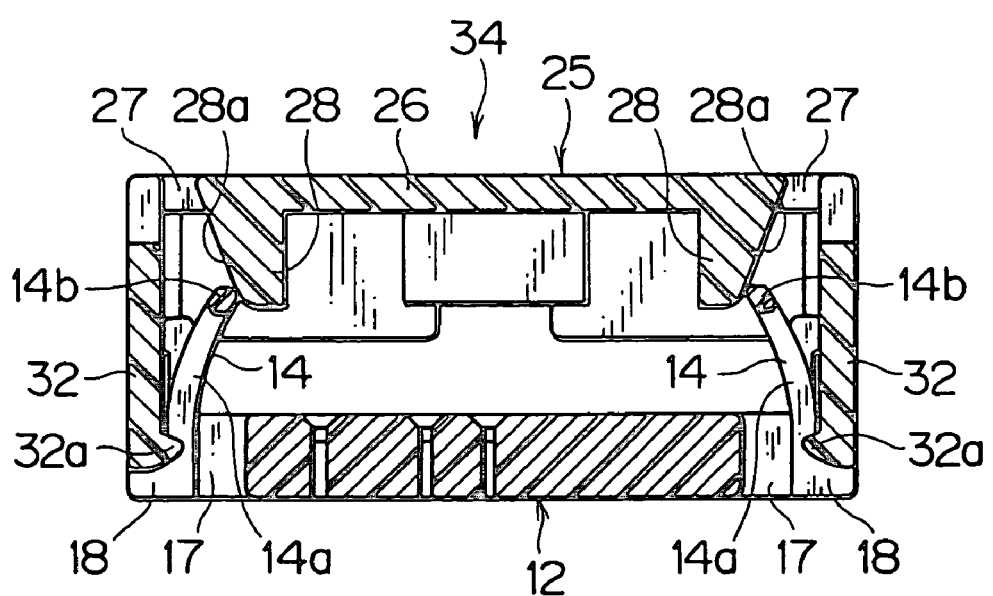
FIG. 5 is a section view showing the LED lamp module 34 being halfway assembled.
Figure 6:
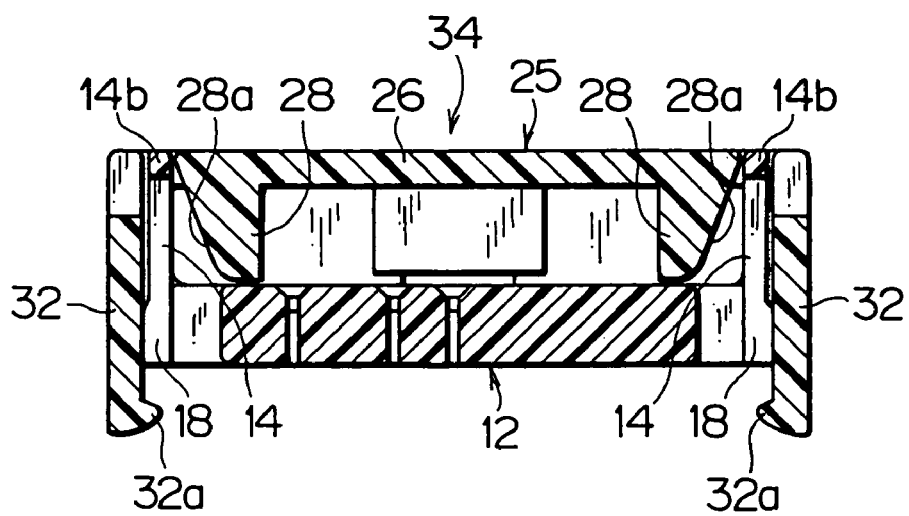
FIG. 6 is a section view of the LED lamp module taken on line B-B in FIG. 4.

Further, the locking frame 14 is formed to be curved inward from the base part 14a to the free end 14b. The reason why the locking frame 14 is formed to be curved as described above is because, the locking frame 14 of the base 12 can be prevented from blocking the corresponding locking arm 32 of the cover 25 when coupling the cover 25 and the base 12 together, namely, the locking frame 14 and the corresponding locking arm 32 can be prevented from interfering with each other, said cover 25 and the base 12 being included by one set of the LED lamp modules 34 (FIG. 5).

Suppose that the locking frame 14 and the corresponding locking arm 32 interfere with each other. When being about to couple the base 12 and the cover 25 together, a sound caused by an interference between the locking frame 14 and the corresponding locking arm 32 and a sound caused by an engagement between the locking hook 16 and the locking groove 33 are generated successively. Then, the interference sound may mislead a worker into believing that the base 12 and the cover 25 are coupled together. Therefore, in this invention, the locking frame 14 is formed to be curved inward to avoid the locking arm 32 for preventing the cover 25 from being incompletely locked.

Further, by preventing the interference between the locking frame 14 and the locking arm 32, the locking arm 32 is prevented from being flattened or damaged and the vertically coupled LED lamp modules 34 are prevented from being removed, so that reliability of said coupling may be improved.

Each guiding groove 18 is formed at a base of each locking frame 14. The guiding groove 18 is a groove, into which the corresponding locking arm 32 of the cover 25 is inserted, when coupling the base 12 and the cover 25 together, said base 12 and the cover 25 being included by one set of the LED lamp modules 34.

Figure 7:
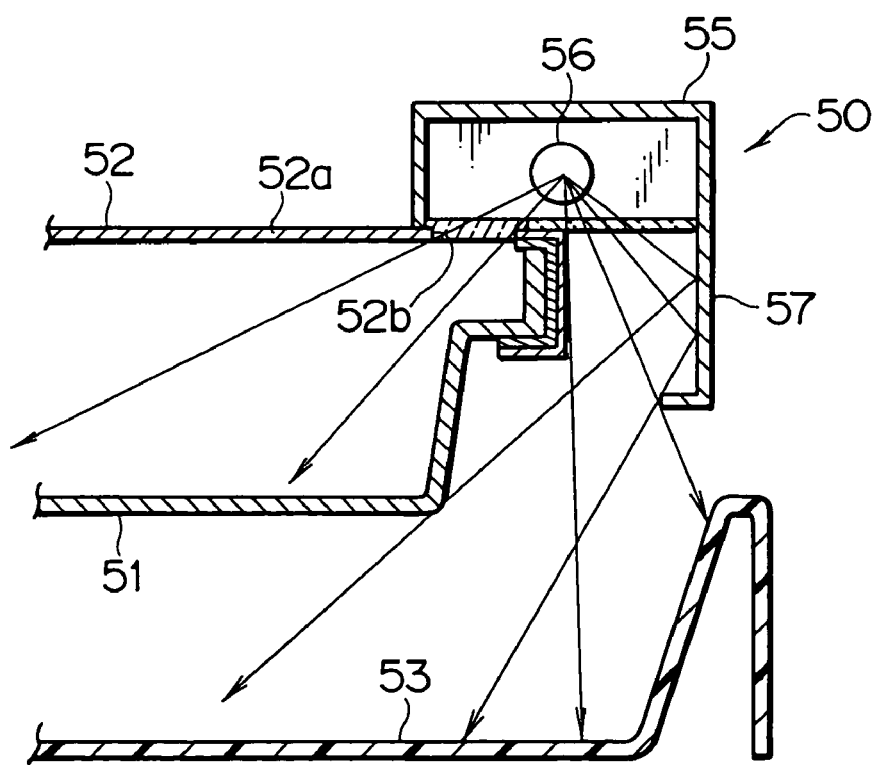
FIG. 7 is a section view showing one example (first embodiment) of a conventional illumination device.
Figure 8:
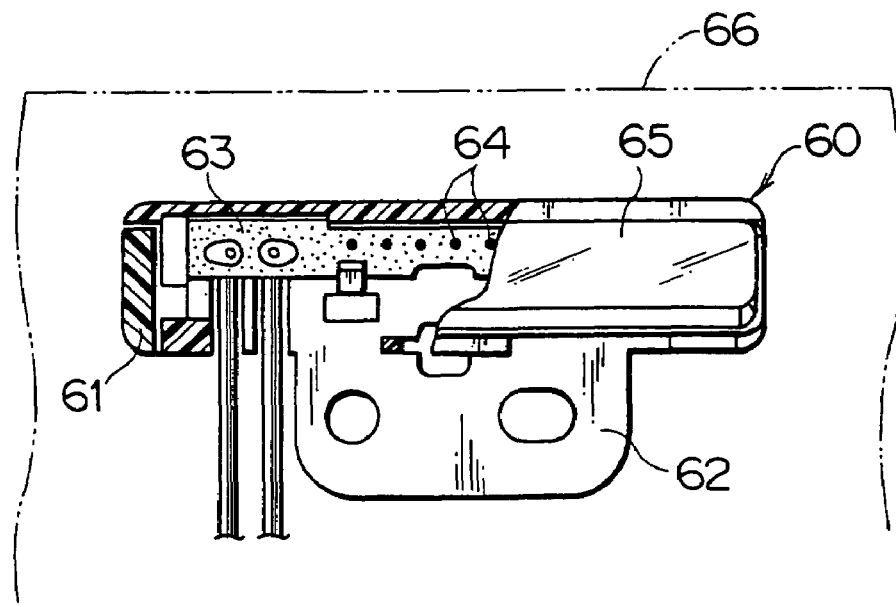
FIG. 8 is a section view showing another example (second embodiment) of the conventional illumination device.

A distal end of the locking arm 32 guiding through the guiding groove 18 protrudes downward from a back surface of the base 12 to engage with the locking frame 14 of the lower base 12 of the lower LED lamp module 34 (FIG. 7).

In addition, the locking arm 32 of the lowest cover 25 of the lowest LED lamp module 34, arranged at a bottom of the LED illumination device 10, functions as a locking part to be locked on a wall of such as a console box or a glove box.

The reinforcing ribs 20 for the pressure contact part have respective U-like shapes, being as ribs for reinforcing corresponding crimp terminals 37 standing up in a line at an edge of a bus bar 36, arranged between electric wire guides 22, said guides arranged at both the front and back of the base 12, and standing perpendicular to the base 12.

A pair of these reinforcing ribs 20 for the pressure contact part are arranged alternately to reinforce respective pressure contact terminals 37. Thus, each of the pressure contact terminal 37 is pressed in between the reinforcing rib 20 and the electric wire guide 22. Said pressure contact terminal is prevented from falling outside, while the electric wire is crimped.

The electric wire guide 22 has a W shape, keeps a two-conductor electric wire 40, which includes a power line 40a and a ground line 40b, straight, and is arranged outside the reinforcing rib 20. The power line 40a, being connected to a battery, is held in between a center wall 22a and one of the side walls 22a. The ground line 40b is held in between the center wall 22a and the other side wall 22a.

A gap between the pair of walls 22a is a little narrower than outer diameters of the power line 40a and the ground line 40b, so that the electric wire 40 on the base 12 can be clipped by the walls.

The bus bar circuit 35 includes the bus bar 36 as a conductive circuit, the LED chip 38 soldered to the bus bar 36, and a current regulation diode 39. The bus bar 36 is formed by punching a conductive substrate according to a circuit pattern, having a thin plate shape. Crimp terminals 37 to be connected to the electric wire 40 stand together at the end of the bus bar 36.

Each of the crimp terminals 37 has a pair of crimp pieces 37a, 37a in its front and back. A slot, into which the electric wire 40 is pressed, is formed in between the pair of crimp piece 37a, 37a. An electric current is fed from the battery through the bus bar 36 to supply electric power to the LED chip 38 through the current regulation diode 39.

In addition, according to this invention, the conductive circuit is not limited to the bus bar 36, but extends to a print circuit board on which conductive wiring is printed.

The LED chip 38 is a surface mounting type white light emitting diode having two, positive and negative, electric power terminals. In this embodiment, the LED chip 38 rated at 20 milliamperes 3.5 volts is used. The battery voltage is reduced by the current regulation diode 39 to adjust to the rated 3.5 volts.

The current regulation diode 39 is effective against voltage fluctuation occurred in such as a vehicle, however, if the voltage does not fluctuate, a current limiting resistor can be used. The color of the LED chip 38 is not limited to the while. Red, blue and green can be used for the color of the LED chip 38.

As explained in above Prior Art section, the LED chip 38 features low power consumption, longevity, high directivity, high intensity, and the like. The reason of its low power consumption, and its longevity is because conversion efficiency of LED converting from electricity to light is very high (90%). The reason of its high directivity and its high intensity is because the emitting light of the LED is not a diffused light of such as an incandescent lamp. In addition, a light source of this invention is not limited to the LED chip 38 as described above, and various LED chips with various outputs can be used. Further, the light source is not limited to the surface mounting type LED chip 38, and bullet type LEDs can be used.

The cover 25 is formed in a rectangular box shape by plastic molding, having a ceiling wall 26 and a surrounding wall 30 perpendicular to and connected to the ceiling wall 26 at its edge. A lower part of the cover 25 is formed as an opening to cover and protect the bus bar circuit 35.

The locking arms 32, the locking grooves 33, a projection window 31 and an electric wire outlet 42 are formed on the surrounding wall 30. The guide rib 28, the guiding hole 27 (FIG. 4) and a wire retainer 43 are formed on the ceiling wall 26.

The locking arm 32 is a projection extending from the surrounding wall 30. A hook 32a is formed on an distal end of the locking arm 32. This locking arm 32 is formed at a position corresponding to the locking frame 14 of the base 12. Therefore, when connecting the LED lamp modules 34, the locking arm 32 is engaged with the locking frame 14 of the lower base 12.

Since the locking arm. 32 has resiliency, the upper and lower LED lamp modules 34 can smoothly be coupled together. Further, by bending the locking arm 32 outward, the upper and lower LED lamp modules 34 can easily be removed.

The locking grooves 33 (FIG. 4) is arranged corresponding to the hook of the base 12, and formed at an intersection between the surrounding wall 30 and the ceiling wall 26. When coupling the cover 25 to the base 12, the locking hook 16 is engaged with the locking grooves 33 to prevent the cover 25 from being decoupled.

The projection window 31 allows the light of the LED chip 38 to emit outward, having a rectangular shape. A frame of the window is chamfered to have a slope surface 31a, so that the emitting light may be diffused at a specific aperture angle.

The LED lamp modules 34 of this embodiment are so arranged that the each side of the frame has an aperture angle of 60 degrees. The light emitted from the LED chip 38 is so arranged as to be emitted in a horizontal direction of the LED lamp modules 34.

The electric wire outlet 42 is a notch formed at a position corresponding to the electric wire 40 of the bus bar circuit 35. The electric wire outlet 42 is so formed that when coupling the base 12 and the cover 25 together, the electric wire 40 can be pulled out through the electric wire outlet 42.

The guide rib 28 (FIG. 5, 6) is for straitening the curved locking frame 14 protruding toward the base 12, and stands up from the ceiling wall 26, facing the locking arm 32.

Since a height of the guide rib 28 is lower than that of the locking arm 32, when the cover 25 is coupled with the base 12, after the locking arm 32 is inserted through the locking frame 14, a slope 28a of the guide rib 28 is contacted with the locking frame 14.

By the guide rib 28 straightening the locking frame 14, the locking frame 14 enters the guiding hole 27 to be connected to the upper LED lamp module 34.

The guiding hole 27 (FIG. 4) is arranged corresponding to the locking frame 14 of the base 12, so that the distal end of the locking frame 14 can enter the guiding hole 27. An opening is formed at the surrounding wall side of the guiding hole 27.

When the locking arm 32 of the cover 25 of the upper LED lamp module 34 (FIG. 1, 2) enters the opening, the hook 32a of the locking arm 32 is engaged with the locking frame 14.

The wire retainer 43 (FIG. 3) faces the electric wire outlet 42, and a height of the wire retainer 43 is substantially equal to or higher than that of the electric wire outlet 42. When coupling the base 12 and the cover 25 together, by the distal end of the wire retainer 43 pressing down the electric wire 40, the electric wire 40 is so fixed as not to move in a longitudinal direction of the electric wire 40.

According to this embodiment as described above, by covering the bus bar circuit 35 attached to the base 12 with the cover 25, the LED chip 38 and the current regulation diode 39 as electrical parts are protected, and reliability of their electric connection is maintained. Further, by engaging the locking frame 14 of the base 12 of the lower LED lamp module 34 and the locking arm 32 of the cover 25 of the upper LED lamp module 34 with each other, a plurality of LED lamp modules 34 are connected together in a vertical direction. Therefore, the intensity of the LED illumination device 10 can be adjusted properly according to the size of the small container, such as a console box, a glove box, a handy pocket or an ash tray.

Since only one LED chip 38 is mounted on the bus bar circuit 35, the LED lamp module 34 can be miniaturized and be mounted on the small container such as an ash tray. The LED illumination device 10 having many LED lamp modules 34 coupled each other can be used for such as an interior roof lamp or a map lamp.

In addition, "upper" and "lower" in this description are defined according to the figures, and may be reversed in a practical use. Further, in this description, the locking frame 14 is formed on the base 12, and the locking arm 32 is formed on the cover 25. However, the locking arm 32 may be formed on the base 12, and the locking frame 14 may be formed on the cover 25.

Further, the locking hook 16 is formed on the base, and the locking grooves 33 is formed on the cover 25 in this description. However, the locking grooves 33 may be formed on the base 12, and the locking hook 16 may be formed on the cover 25.

In addition, this invention is not limited to the embodiments as above described, and various changes and modifications can be made without departing from the spirit and scope of this invention.

Figure 10:
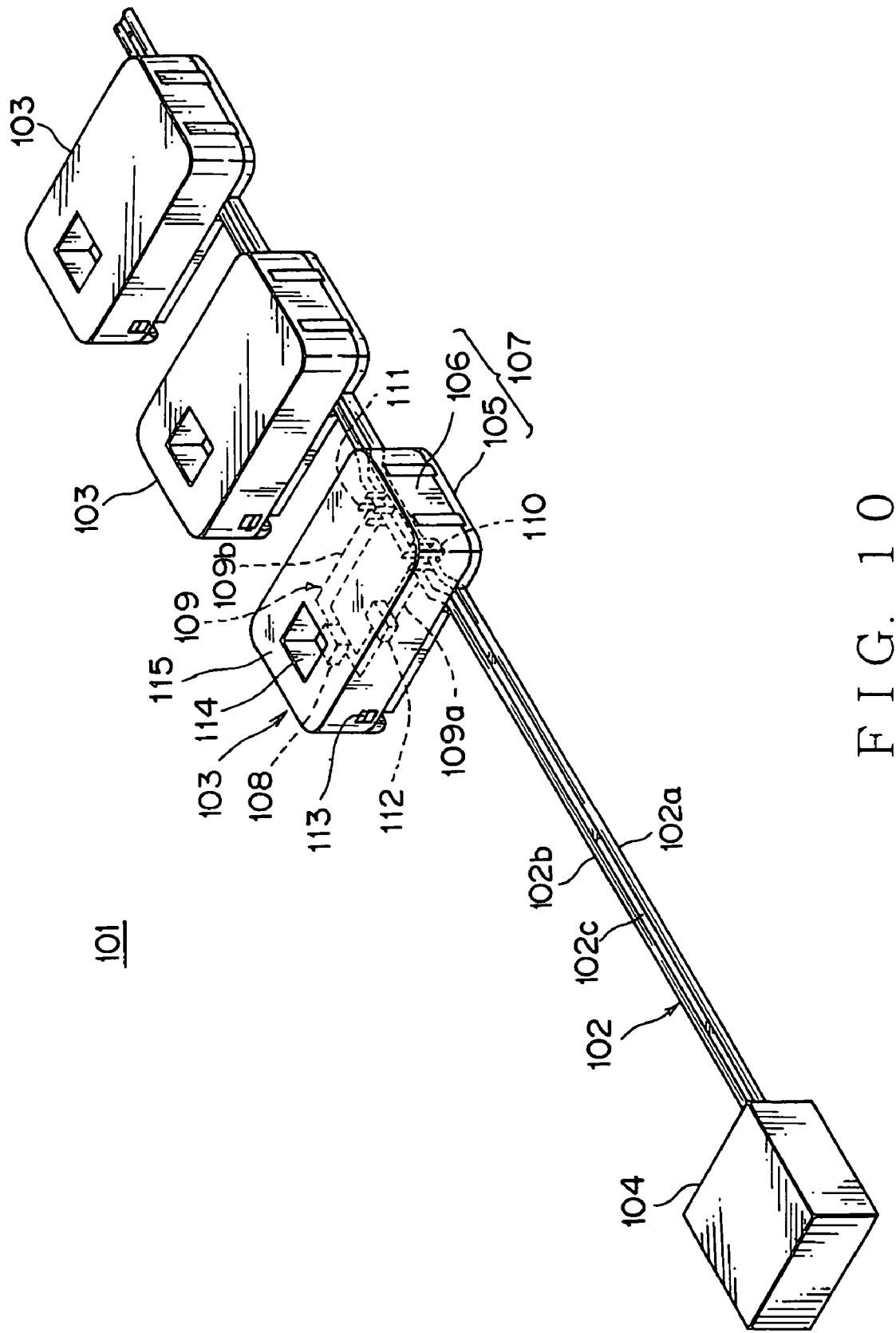
FIG. 10 is a perspective view showing one embodiment of a lamp module assembly according to this invention.

FIG. 10 shows one embodiment of a lamp module assembly according to this invention.

This Lamp module assembly 101 is formed by connecting a plurality of LED lamp modules 103 directly to one flat cable 102 without any branch cable, and arranging said LED lamp modules 103 in longitudinal direction of a harness of the cable.

One junction box 104 or one junction connector 104 is arranged at and connected to a terminal of the flat cable 102. For example, the junction box 104 is connected to the battery (power source) through the not-shown harness, and the junction connector 104 is connected to the junction box through the not-shown harness.

The junction box is an existing junction box and includes, for example, a case made of synthetic resin, a circuit board or a wiring board (not shown), a connector, a fuse holder, a relay holder in the case. Said junction box is, for example, located in an engine compartment or near an instrument panel.

As shown in the prior art described above, the junction connector 104 is for separating a branch harness from a trunk wire harness. In the embodiment shown in FIG. 10, the flat cable 102 corresponds to the branch harness.

The junction connector is located at downstream of the junction block, for example, a front pillar or its neighborhood.

The flat cable 102 is formed by connecting a middle flat insulating ribbon 102c between one insulating coating positive electric wire 102a and one insulating coating negative electric wire 102b. Said two insulating coating wires 102a, 102b can be separated at a specific position of the flat insulating ribbon.

Each LED lamp module 103 includes a case 107 made of synthetic resin, a chip type LED (light emitting diode) 108 arranged in the case 107, a bus bar (conductor circuit) 109 made of conductive metal, and connected to the LED 108 by such as soldering, each of pressure soldered terminals (electric wire joints) 110, 111 being continued to the bus bar 109, and being pressure soldered to each of the insulating coating electric wire 102a, 102b. In addition, the bullet type LED can be used the chip type LED.

In this embodiment, a chip type resistor (electric resistance) 112, as a voltage reducing component, is connected to an upstream part 9a in the middle of the bus bar 109, which is connected to the positive wire 102a. In addition, preferably, the resistor 112 is arranged solely in the junction box 104 or junction connector 104, instead of arranged in each LED lamp module 103. In this manner, the number of the resistors 112, parts cost, man-hours are reduced, and the LED lamp module 103 is further miniaturized.

Further, a protective diode (not shown) for the LED can be arranged on the bus bar 109, or arranged solely in the junction box or the junction connector. As the protective diode for the LED, a zener diode may be connected to the positive and negative bus bars respectively, arranged across the bus bar in front of the LED. The case includes a base 105 and a cover 106. An engaging means 113 engages the base 105 and the cover 106 with each other. A window 114 for emitting the light of the LED 108 is formed on the cover 106. The LED 108, the bus bar 109, the resistor 112 and the like are arranged on the base 105. The window 114 is preferably formed in a taper shape corresponding to an illuminating angle of the LED 108. In this embodiment, the LED 108 is arranged upward, having an emitting surface to emit upward. Further, the window is formed on an upper wall (ceiling) 115. The pressure contact terminals 110, 111 are formed integrally with the bus bar 109. For instance, the pressure contact terminals 110, 111 are punched at ends of the bus bar 109, then bent to stand up perpendicular to the bus bar 109.

At each the LED lamp module 103, two of positive and negative electric wires 102a, 102b of the flat cable 102 is separated radially from each other in the middle of the wires in the longitudinal direction. The positive electric wire 102a is pressure contacted to the pressure contact terminal 110 of the upstream bus bar part 9a continued to an anode of the LED 108, and the negative (earth) wire 102b is pressure contacted to the pressure contact terminal 111 of the negative bus bar part 9b continued to the cathode of the LED 108. Both of the electric wires 102a, 102b are pressure contacted, while the cover 106 is open. The bus bar 109, the LED 108, the resistor 112 are previously mounted on the base 105. The surface-mounting is particularly effective among mounting techniques.

The flat cable 102 extends straight in a transverse direction of the case 107 to connect each LED lamp module in parallel relatively closely. Spacing between the LED lamp modules 103 can be the same, or changed corresponding to specifications such as places or objects to be illuminated. LED lamp modules 103 can be closer to or more distant from each other than those in FIG. 10. The number of the LED lamp modules 103 is changed properly corresponding to such as intensity design, and can be one or more.

The lamp module assembly 101 having the structure as described above is located on such as a roof, a console box, a glove box, an ash tray, a cup holder, and a floor of a vehicle. When located on the roof, the Lamp module assembly 101 is adapted to a map lamp, a room lamp and a rear reading light.

Further, the Lamp module assembly 101 can be also used for a turn signal lamp, a stop lamp, a rear lamp, a license plate lamp, and the like. These applications are also common to each embodiment described below.

Figure 11:
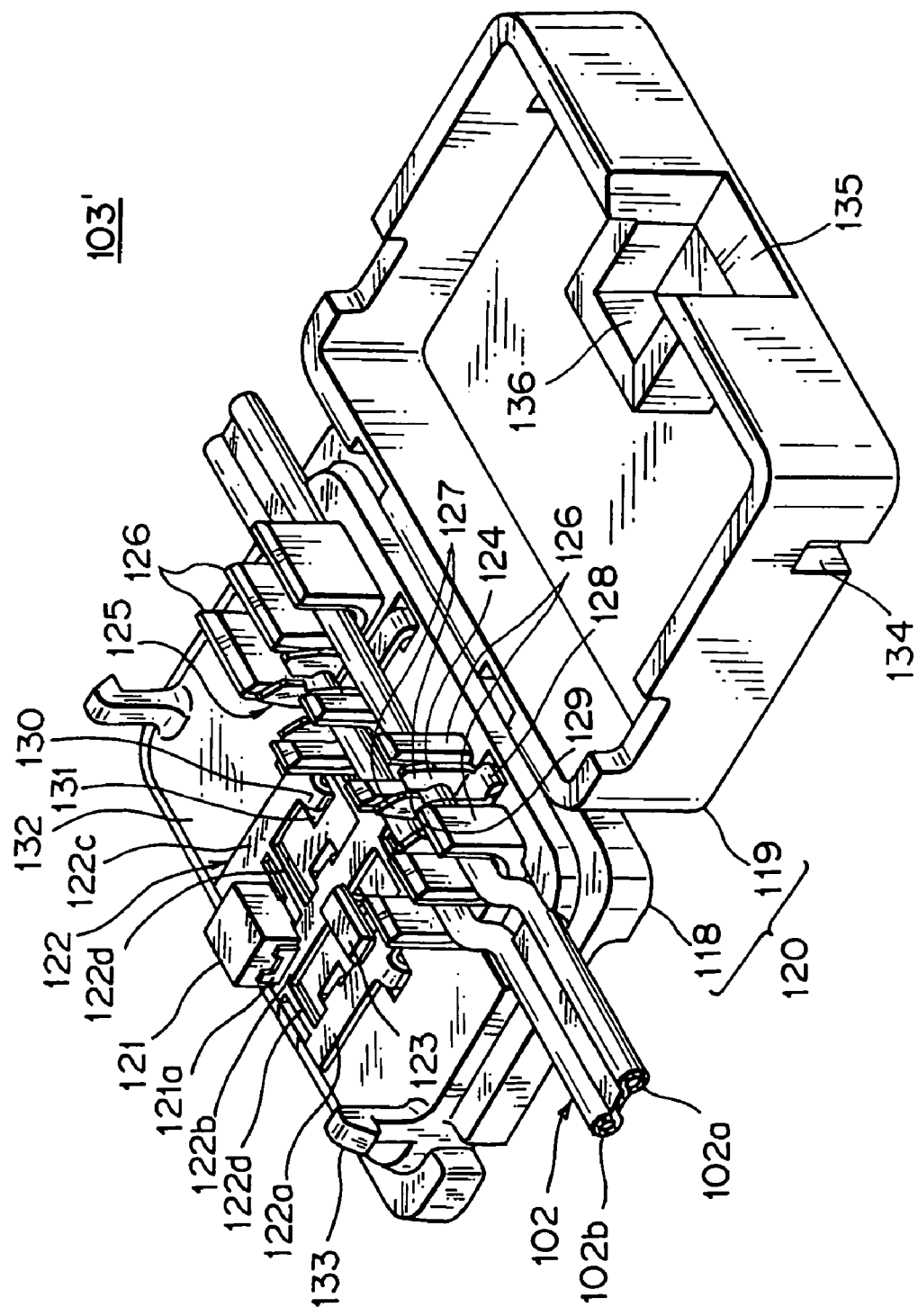
FIG. 11 is a perspective view showing another embodiment of the LED lamp module according to this invention.

FIG. 11 shows another embodiment of the LED lamp module in detail, being different from the above described embodiment.

This LED lamp module 103' includes a case having a base 118 made of synthetic resin and a cover 119, an LED 121 surface-mounted on the base 118, a bus bar (conductive circuit) 122 having pressure contact terminals, and a resistor 123 (a voltage reducing component). Two insulating coating electric wires 102a, 102b of the flat cable 102 are wired through respective electric wire guides 126 protruding from the base 118, and pressure contacted respectively to the pressure contact terminal (electric wire junctions) 124, 125 in between the electric wire guides 126 in a longitudinal direction of said wires. The surface-mounting is particularly effective among mounting techniques.

Each of the pressure contact terminals 124, 125 includes a pair of pressure contact pieces 127 in front and back of each terminal and standing perpendicular to the base 118, a flat substrate 128 connecting said pair of pressure contact pieces 127 together, and each slot 129 for slitting (ripping) the coating of the electric wire is arranged between each pair of the pressure contacting piece. Said substrate 128 is continued to the bus bar 122 integrally. Two electric wires 102a, 102b are individually connected to respective pressure contact terminals 124, 125 being separated longitudinally.

By such as not-shown pressure contact blade pressing the electric wires 102a, 102b, said wires are connected to the pressure contact terminals 124, 125. By staggering each pressure contact terminals 124, 125 in a longitudinal directions of the electric wires, the LED lamp module 103' can be miniaturized in a radial direction of the electric wires.

Each pair of pressure contact pieces 127 of respective pressure terminals 124, 125 is in contact with an end surface of the electric wire guides 126 at outsides of its thickness direction, namely at its front and back, to be protected from falling down. The electric wire guides 126 includes a pair or three of vertical standing pieces (substituted by the reference number 126) to regulate a leading out direction and positions of electric wires 102a, 102b. These two electric wires 102a, 102b are positioned at once by these three standing pieces, and a middle one of these is common to the two electric terminals.

The bus bar 122 has a substantially rectangular shape, including three wide bus bar parts 122a to 122c perpendicular to the electric wires and a narrow part 122d connecting said wide parts 122a to 122c in a transverse direction. The wide part 122a as one side of said tree wide parts is continued to the positive electric wire 102a through the front pressure contact terminal 124, and connected to the center wire part 122b through the resistor 123. Respective electrodes (terminal) 121a of the LED 121 are connected to the center wide part 122b and the wide part 122c as the other side of the wide parts by means of soldering, crimping, or the like. The other side wide part 122c is connected to the negative electric wire 2b through the pressure contact terminal 125 at the back side.

The narrow part 122d also functions as a resistor. After connecting such as a resistor to the bus bar parts, each narrow part 122d may be removed by cutting. In this case, the narrow part 122d maintains the whole shapes of the bus bar 122 to make connections of such as resistors efficiently.

The substrate 128, continued to the wide parts 122a to 122c and the pressure contact terminals 124, 125, includes an engaging piece 30 for engaging downward, and said engaging piece 30 penetrates into a recess 131 of the base 118 to be engaged.

The bus bar 122 is assembled with a single motion to the base 118 from above. Resultingly, the bus bar 122 can be removed easily when scrapped by disengaging from the base 118.

The base 118 has a horizontal plate-like shape, of which a top surface is a component mounting surface 132. The cover 119 is coupled with the base 118 through a not-shown hinge rotatably. By engaging a coupling hook 133 standing on the base 118 with a recess 134 of the cover 119, the base and the cover 119 are locked together. The LED 121 of this embodiment is arranged at an end opposed to the hinge on the base 118, having a lateral (horizontal) emitting surface. An LED receiving chamber 136 having a lateral window 135 is formed at said corresponding edge on the cover 119. Thus, light of the LED 121 is emitted horizontally.

The LED lamp module 103' has a extremely low-profile light-weight and compact structure, including one plate of the bus bar 122, the small chip type LED 121, the thin type resistor 123, and the pressure contact terminals 124, 125. According to specifications of intensity, layout and the like, a plurality of LED lamp modules 103' are connected directly in a longitudinal direction of the flat cable 102 without any branch cables.

In addition, in the embodiments described above (shown in FIG. 11), by pushing the electric wires 2a, 2b into contact with the pressure contact terminals 124, 125, said wires 2a, 2b can be easily connected. However, it is not limited to the means of pressure contact, but other means such as crimping, welding, soldering and the like can also connect the electric wires with the bus bar.

However, when crimping or soldering, it is necessary to strip a middle of the electric wires, and when welding, a large-scale equipment is needed. When crimping, a crimping terminal is used instead of the pressure contact terminal, and when welding, a part of the bus bar is used as a terminal.

Further, it is possible that the two pressure contact terminals 124, 125 are arranged in parallel in a radial direction of the electric wires, and the two electric wires separated from each other are brought into contact with said respective terminals by pressurizing while being separated widely from each other in the radial direction. However, in this case, the case 120 may be enlarged in the radial direction of the electric wire.

Further, it is also possible that the base 118 and the cover 119 are not coupled integrally through the hinge, but separated individually from each other. Further, the base 118 and the cover 119 can be coupled together by not limited to the coupling hook 133 and the recess 134, but also by the coupling projection and the recess, and the like. Further, the LED 121 can be arranged at the hinge side of the base 118. In this case, the flat cable 102, the pressure contact terminals 124, 125 are arranged at the side opposed to the hinge.

Further, the LED 121 can be arranged at an end of the case in a longitudinal direction of the electric wire. In this manner, by bending the flat cable 102 in such as a U-shape, two LED lamp modules 103', 103' can be arranged right and left, or up and down in parallel. Further, two or more LEDs 121 can be mounted in the case. However, in this case, the illumination intensity of a LED lamp module 103' is increased, so that it cannot be adapted to the specification of intensity being lower than said intensity.

Further, the bus bar can have not only a rectangular shape, but also a U-figure shape (shown in FIG. 10), or the like. Further, other conductive means, such as a printed conductor, a copper foil, an electric wire, can be used instead of the bus bar 122. Further, the bus bar 122 and the pressure contact terminals 124, 125 can be formed not only integrally, but also individually. The pressure contact pieces 127 of the pressure contact terminal can be made not only of pairs front and back, but also of one simple pair left and right. Further, the bus bar can be formed on the base 118 by such as insert molding or plastic welding. Further, shapes of the base 118, the case 19, the bus bar 122 and the like are not limited to those in the embodiments described above.

FIGS. 12 to 18 show respective embodiments of a lamp module assembly according to this invention, wherein a resistor is not arranged in the LED lamp module, but in a junction block, a connector, or a junction connector.

Figure 12:
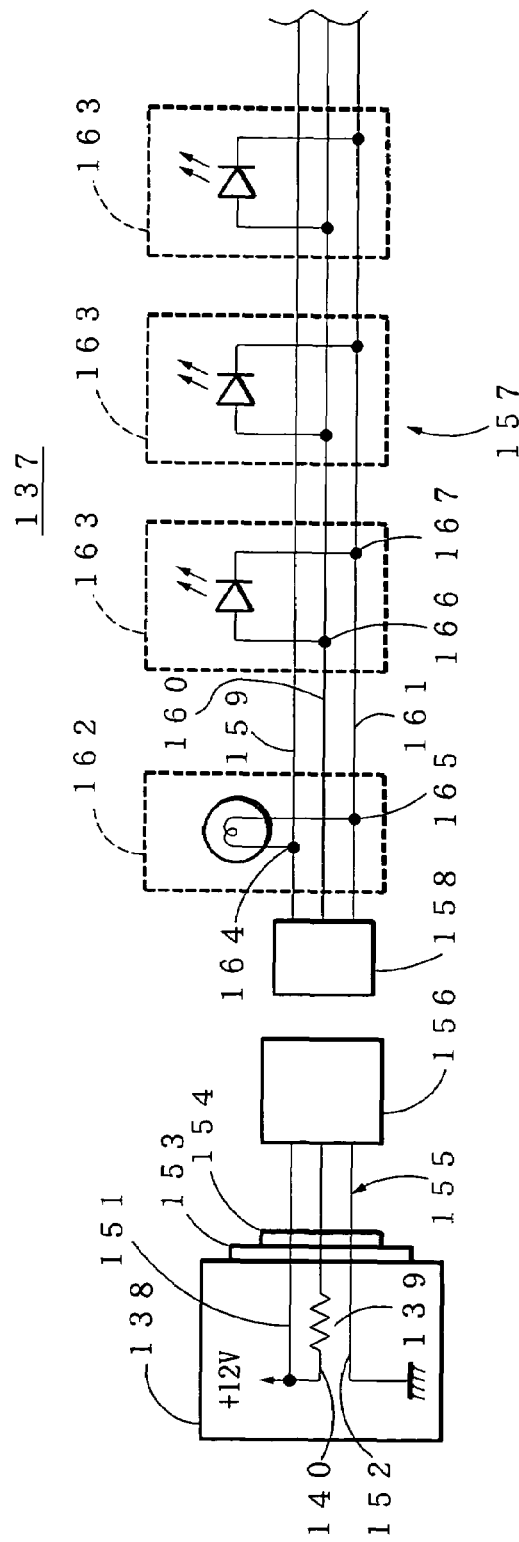
FIG. 12 is a circuit diagram showing one embodiment of a lamp module assembly according to this invention.

In a lamp module assembly 137 shown in FIG. 12, a resistor 139 (a voltage reducing component) is provided in a junction block 138. Said resistor 139 is connected to a positive circuit 140 wired to a vehicle 12 volts battery. Another positive circuit 151 wired to the 12 volts battery is provided in parallel with the resistor 139. A negative ground circuit 152 is provided in parallel with those circuits. Three circuits 140, 151, 152 are connected to a relay harness 155 through male and female connectors (a connector 153 of the junction block 138 and one 154 of two connectors of the relay harness 155). The other connector 156 of the relay harness 155 is connected to a connector 158 of a main part 157 of the lamp module assembly.

The lamp module assembly 137 includes the main part 157 of the lamp module assembly, the relay harness 155 and the junction block 138. Otherwise, if the main part 157 of the lamp module assembly is defined as a Lamp module assembly, FIG. 12 shows a connection structure of the Lamp module assembly.

The main part 157 of the lamp module assembly includes the connector 158 connected to the relay harness 155, three electric wires (circuits) 159 to 161 wired to respective terminals in the connector 158, one bulb lamp module 162 and a plurality of LED lamp modules 163.

One terminal of the bulb lamp module 162 is connected to the positive circuit 159 not connected to the resistor 139, while the other terminal of the bulb lamp module 162 is connected to a ground circuit 161. Further, one terminal of each LED lamp module 163 is connected to the positive circuit 160 wired to the resistor 139, while the other terminal of said each LED lamp module 163 is connected to the ground circuit 161. The ground circuit 161 is common to the bulb lamp module 162 and each LED lamp module 163.

According to the lamp module assembly 137 shown in FIG. 12, since the resistor 139 is provided on the junction block 138 as a base in common use, and not provided on each LED lamp module 163, the LED lamp module 163 can be miniaturized and at lower cost owing to reduction of the number of the resistors 139.

In addition, each of the circuits 159 to 161 of the main part 157 of the lamp module assembly may be directly connected to the junction block 138 by a connector without the relay harness 155. Further, said each of the circuits 159 to 161 of the main part 157 of the lamp module assembly may not be connected by a connector, but led out from an interior of the junction block 138.

Figure 13:
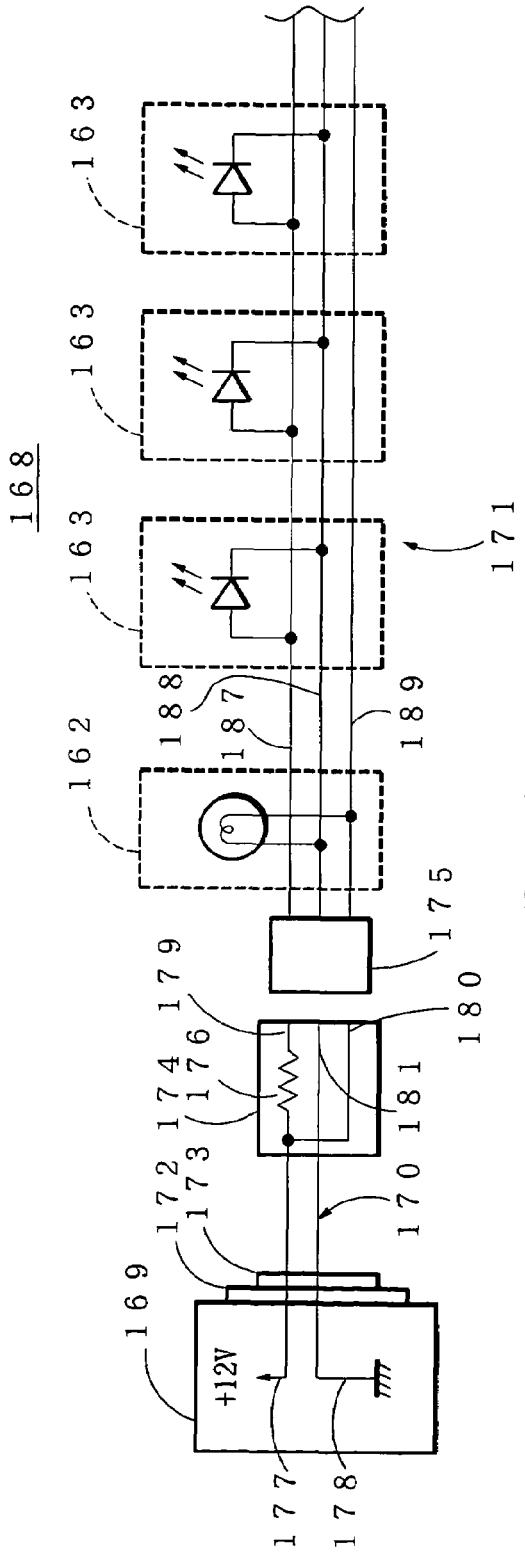
FIG. 13 is a circuit diagram showing another embodiment of the lamp module assembly.

A lamp module assembly 168 shown in FIG. 13 includes a junction block 169, a relay harness 170 connected to the junction block 169 by a connector and a main part 171 of the lamp module assembly connected to the relay harness 170 by a connector. Said lamp module assembly 168 is characterized in that a resistor 176 (a voltage reducing component) is provided in any one of connectors 172, 173 for connecting the junction block 169 to the relay harness 170, connectors 174, 175 for connecting the relay harness 170 to the main part 171 of the lamp module assembly. FIG. 13 shows one embodiment wherein the resistor 176 is provided in the connector 174 of the relay harness 170.

The junction block 169 includes a positive circuit 177 and a ground circuit 178, both being wired to the vehicle battery. Both circuits 177, 178 are connected to one connector 173 of the relay harness 170 by a connector 172. Two positive terminals 179, 180 and one negative terminal 181 are arranged in the other connector 174 of the relay harness 170.

The positive terminal 180 and one terminal of the resistor 176 are connected to the positive circuit 177 in common, the negative terminal 181 is wired to the ground circuit 178, and the other terminal of the resistor 176 is connected to the positive terminal 179 in the connector 174. The connector 174 includes at least a connector housing made of synthetic resin, the terminals 179 to 181 and the resistor 176.

Figure 14:
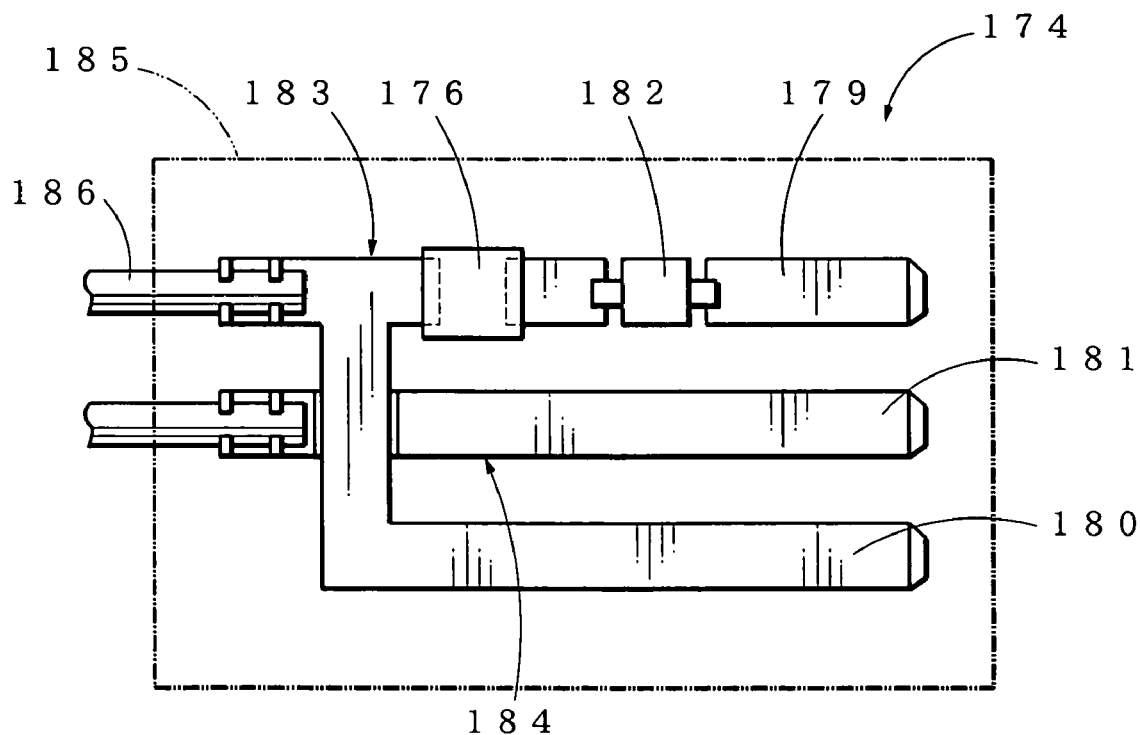
FIG. 14 is an explanatory view showing one embodiment of a connector of the lamp module assembly shown in FIG. 13.

In one embodiment of the connector 174 as shown in FIG. 14, positive terminals 179, 180 are formed integrally with the bus bar 183. The chip type resistor 176 and an electrostatic protection diode 182 are connected (surface-mounted) in series in a middle of the bus bar. The diode 182 is wired to the terminal 179. A negative bus bar 184 is, for example, formed by punching and bending with a positive bus bar 183 integrally. Then, after the resistor 176 and the like are mounted, the negative bus bar is separated from the positive bus bar 183. It is possible to fix the bus bars 183, 184, the resistor 176, and the like to a connector housing 185 by synthetic resin molding. Electric wires 186 are connected to respective bus bars 183, 184 by means of pressure contact, crimping, welding and the like. A circuit pattern in the connector 174 is not limited to FIG. 14.

Further, in FIG. 13, the resistor 176 and the diode 182 are not limited to be provided on the connector 174, but can be provided on any one of other connectors 172 to 175.

In the embodiment shown in FIG. 13, by connecting the main part 171 of the lamp module assembly to the relay harness 170, the voltage reduced by the resistor 176 in the connector 174 is supplied to each LED lamp module 163.

As the embodiment shown in FIG. 12, the main part 171 of the lamp module assembly includes a bulb lamp module 162, a plurality of LED lamp modules 163 and three circuits (electric wires) 187 to 189 connecting said modules. The bulb lamp module 162 is connected to the positive 12 volts circuit 189 and to the negative circuit 188. Each LED lamp module 163 is connected to the positive circuit 187 wired to the resistor 176, and to the common negative circuit 188.

According to the lamp module assembly 168 as shown in FIG. 13, since the resistor 176 is not provided in each LED lamp module 163, but in any one of the connectors 172 to 175 electrically connecting the junction block 169 to the main part 171 of the lamp module assembly in common, the LED lamp modules 163 can be miniaturized and at lower cost owing to reduction of the number of the resistors.

In addition, the connector 175 of the wire harness (including each of the circuits 187 to 189) of the main part 171 of the lamp module assembly may be directly connected to the connector 172 of the junction block 169 by engagement without the relay harness 170. In this case, the resistor 176 is provided in the connector 172 of the junction block 169 or the connector 175 of the main part 171 of the lamp module assembly.

Further, it is possible to connect the main part 171 of the lamp module assembly to the junction block 169, a junction connector 193 described below, or the like (not shown) through a connector.

In this case, the resistor 176 can be provided in the connector 175 of the main part 171 of the lamp module assembly or a connector of other circuits (not shown).

A lamp module assembly 190, shown in FIG. 15, includes the junction block 169, a relay harness 191 connected to the junction block 169 by a connector, a main part 192 of the lamp module assembly connected to the relay harness 191.

The lamp module assembly 190 is characterized in that the main part 192 of the lamp module assembly is branched by a junction connector 193 to circuits 194, 195 of the bulb lamp module and circuits 96, 197 of the LED lamp modules, said junction connector 193 having a resistor 198 (a voltage reducing component).

As the previous embodiment, the junction block 169 as a base includes the positive circuit 177 (electric wire) wired to the vehicle battery, and the negative grounded circuit 178 (electric wire), both circuits 177, 178 being connected to the one connector 173 of the relay harness 191 by the connector 172.

As the one connector 173, the other connector 199 of the relay harness 191 includes one positive terminal and one negative terminal.

The main part 192 of the lamp module assembly includes a connector 200 for connecting the relay harness 191, two, positive and negative, circuits (electric wires) 201, 202 wired to the connector 200, the junction connector 193 connected to the two circuits 201, 202 respectively, two, positive and negative, circuits (electric wires) 196, 197 of the LED lamp modules, and a plurality of LED lamp modules 163 connected to said two circuits 196, 197.

In addition, a structure of the main part 192 of the lamp module assembly can be expressed by an expression that a second relay harness includes the connector 200, circuits 201, 202 wired to the connector 200 and the junction connector 193, said junction connector 193 being connected to the main of the lamp module assembly.

In the junction connector 193, the circuits 201, 202 wired from the vehicle battery to the circuits 194, 195 of the bulb lamp module, while the positive circuit 194 is connected to the positive circuit 196 of the LED lamp module through the resistor 198, namely, one terminal of the resistor 198 is connected to the positive circuit 194 of the bulb lamp module and the other terminal of the resistor 198 is connected to the positive circuit 196 of the LED lamp modules. In the junction connector 193, the negative circuit 195 of the bulb lamp module is connected to the negative circuit 197 of the LED lamp modules.

Normally, the junction connector 193 is connected respectively to the circuits 194, 195 of the bulb lamp module and the circuits 196, 197 of the LED lamp module by connectors. However, only the circuits 194, 195 of the bulb lamp module may be led out integrally from the junction connector 193, or the circuits 201, 202 of the connector 200 wired from the relay harness 191 can be connected to the junction connector 193 through a connector.

According to the lamp module assembly 190 shown in FIG. 15, the resistor 198 is not provided in each LED lamp module 163, but provided in the intermediate junction connector 193 in common. Therefore, the LED lamp module 163 can be miniaturized and at lower cost owing to reduction of the number of the resistors.

Further, as the embodiment shown in FIG. 13, since providing the resistors 176, 198 in the intermediate connector 174 (FIG. 13) or the intermediate junction connector 193 (FIG. 15) respectively, but not in the junction block 138 of FIG. 12 far from the LED lamp modules 163, voltage reduction accuracy for the LED lamp is improved a little.

Of course, the voltage reduction accuracy of the embodiment shown in FIG. 12, wherein the resistor 139 is provided in the junction block 138, practically has no problems.

The modules reducing the resistors 12, 123 from the LED lamp modules 103, 103' shown in FIGS. 10 to 11, and a LED lamp module described below (FIG. 19) can be properly adapted to the lamp module assemblies 137, 168, 190 shown in FIGS. 12 to 15.

Of course, these modules are not limited to the lamp modules 103, 103' shown in FIGS. 10 to 11, or LED lamp modules described below. For example, a lamp module (not shown) having the optional shapes of the base 118, the cover 119, the case 120, conductive circuits (such as the bus bar 122 or lead terminals) and electric wire joints (pressure contact terminals 124, 125) are adapted to the embodiments in FIGS. 12 to 15, in which positions of the resistors 139, 176, 198 are varied.

Further, the embodiments shown in FIGS. 12 to 115 and described below, conductors such as solenoid (coil), a tree terminal regulator, a DC/DC converter, and the like can be adapted for use as a voltage reducing component. Solenoids are resistance in a broad meaning.

Figure 18:
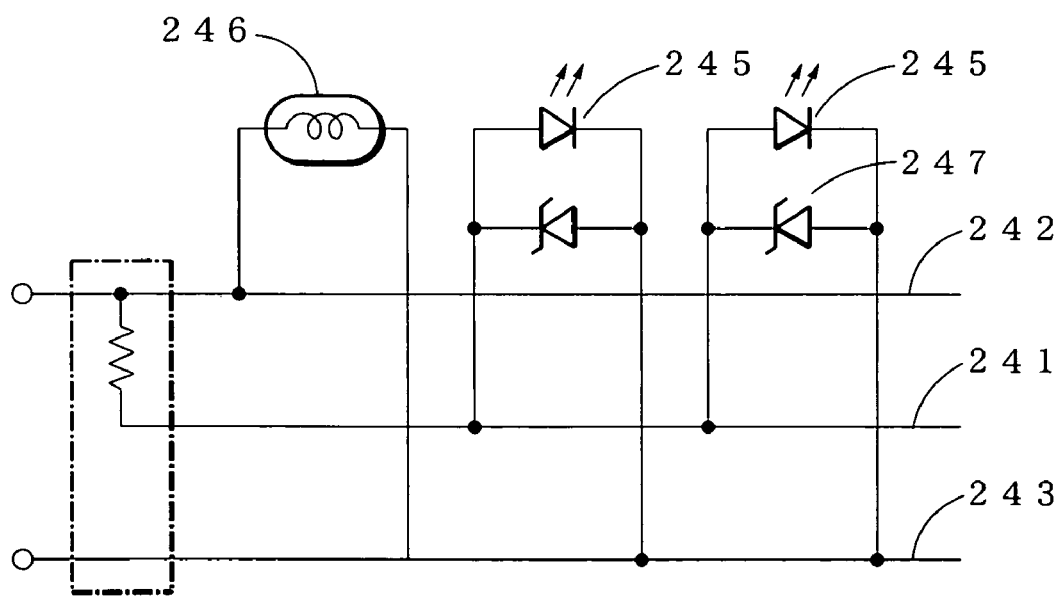
FIG. 18 is an explanatory view showing a detailed circuit diagram of the same embodiment.
Figure 16:
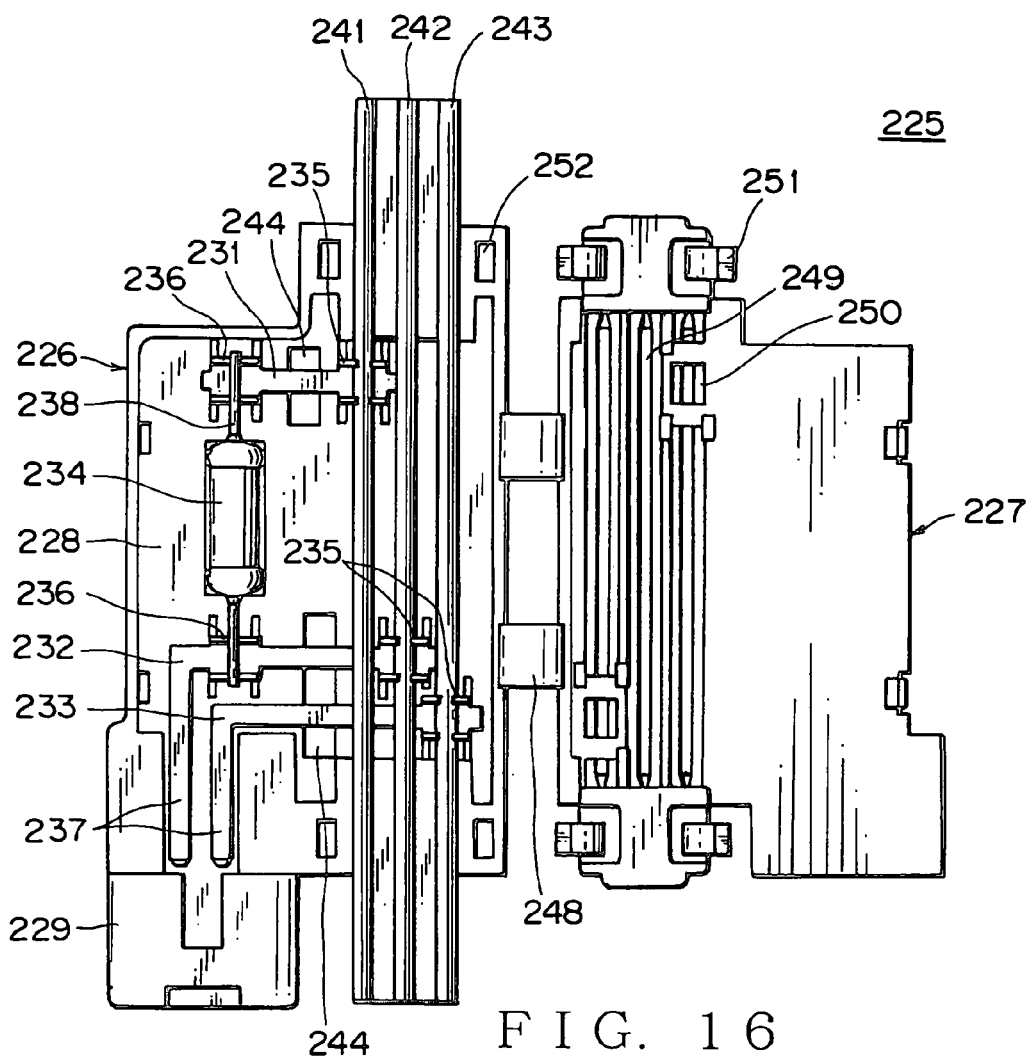
FIG. 16 is a plane view showing another embodiment of the connector of the lamp module assembly.
Figure 22:
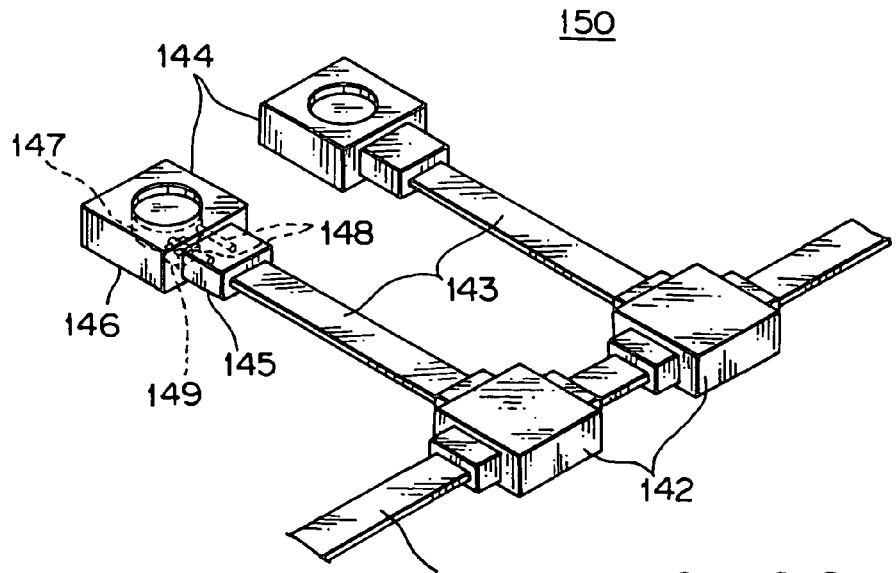
FIG. 22 is a perspective view showing one embodiment of a conventional LED lamp module assembly.

FIGS. 16 to 18 show another embodiment of this invention, in which a resistor as a voltage reducing component is provided in a connector. The embodiment in FIG. 13 described above shows that the resistor is provided in the connector 174 of the junction block 169. In this embodiment, the resistor is provided in a connector of the main of the lamp module assembly (corresponding to the connector 175 in FIG. 13).

As shown in FIG. 16, a connector 225 of this embodiment includes a base 226 and a cover 227, both being included in a housing, and made of synthetic resin. The base 226 includes a base main body 228 and a housing main body 229. Three bus bars 231 to 233 having pressure contact terminals and resistors 234 (voltage reducing components) connected to two bus bars 231, 232 of those are mounted on the base main body 228.

The first bus bar is formed short and straight, having two pairs of pressure contact terminals 235, 236 at their respective ends. The second bus bar 232 has a substantially L-like shape, having the same pressure contact terminals 235, 236 at one end and a middle part of the second bus bar. The third bus bar 233 has a substantially L-like shape, having the same pressure contact terminals 235 at one end of the third bus bar. The other ends of the second and third bus bars are arranged in the housing main body 229 as male connector terminals 237.

Respective lead terminals 238 of the resistor 234 are pressed into contact with the pressure contact terminals 236 of the other end of the first bus bar 231 and the middle part of the second bus bar 232. A first electric wire (circuit) 241 is pressed into contact with the pressure contact terminal 235 at the one end of the first bus bar 231. A second electric wire (circuit) 242 is pressed into contact with the pressure contact terminal 235 at the one end of the second bus bar 232. A third electric wire (circuit) 243 is pressed into contact with the pressure contact terminal 235 at the one end of the third bus bar 233. Said three electric wires 241 to 243 are wired as a flat cable.

The reduced voltage, such as 3.5 volts, by the resistor 234 is applied to the first electric wire 241. The power supply voltage, such as 12 volts, is entirely applied to the second electric wire 242. The common ground is applied to the third electric wire 243. Notched holes 244 for heat radiation are formed under the bus bars 231 to 233 respectively in the base main body 228.

The Heat generated by the resistor 234 is conducted to the bus bars 231 to 233 having high heat radiation performance and radiated outside from the notched hole 244.

As shown in FIG. 17, the resistor mounted connector 225 of FIG. 16 is connected to a connector 240 branched from a main wire harness 239. A plurality of 3.5 volt LED lamps and a 12 volt bulb lamp (not shown) are connected to electric wires 241 to 243 pulled out from the resistor mounted connector 225 to form a lamp module assembly 253.

As shown in FIG. 18, a bulb lamp 246 is respectively connected to the 12 volt positive second electric wire 242 and the negative third electric wire 243. The LED lamp 245 is connected respectively to the 3.5 volt positive first electric wire 241 and the negative third electric wire 243, in parallel to a zener diode 247 for electrostatic protection. In FIG. 16, 3.5 volts is applied to the first electric wire 241, and 12 volts is applied to the second electric wire 242. When not using the first electric wire 241, 12 volts is applied between the second and the third electric wires 242, 243.

In FIG. 16, the cover 227 is attached to the base 226 with a hinge 248 so that they can open and close. An electric wire receiving groove 249 and a pressure contact terminal receiving part 250 are formed on the cover 227. A resilient locking hook 251 of the cover 227 is engaged with an engaging concave 252 of the base 226.

As shown in FIG. 17, the connector 240 of the main wire harness 239 is engaged with and connected to the housing main body 229. 12 volt power supply is supplied from one of the terminals 237 to the bus bar 232, the resistor 234, and the bus bar 13. The reduced voltage from 12 volts by the resistor 234 is supplied to the electric wire 241. The 12 volts is supplied to the electric wire 242 through the bus bar 232.

Figure 9:
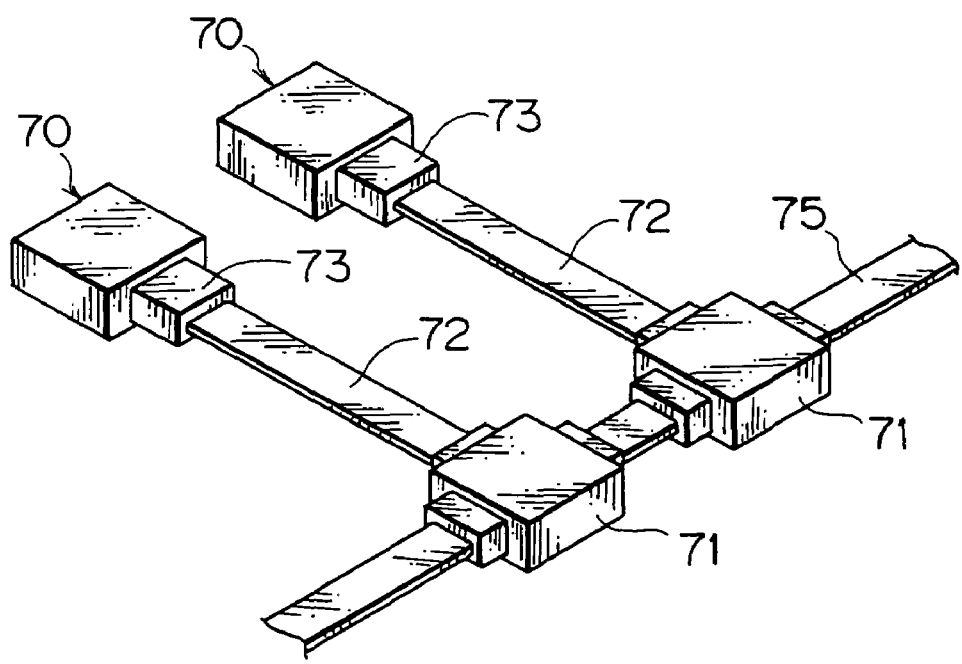
FIG. 9 is a perspective view showing another example (third embodiment) of the conventional illumination device.

According to the embodiments shown in FIG. 16 to 9, since it is unnecessary to provide a resistor in each of LED lamps 245, the number of resistors is reduced to reduce the cost of the lamp module assembly, and the number of the connections of the resistors is reduced to improve electric connection reliability of said assembly. Further, since the circuit 242 for directly supplying the power supply is provided apart from the reduced voltage circuit 241, a unit requiring the power supply voltage can be supplied through the connector 225. Thus, a circuit specification is diversified.

Further, since the connector 225 can be connected to the middle of the wire harness 239, the connector 225 supplying the power supply is connected not limited to the end terminals. Therefore, various forms of the wire harness can be used. Further, since the connector 225 requires no print circuit board, by mounting the bus bars 231 to 233 on the resistor 234, the connector 225 can be miniaturized at lower cost.

FIG. 19 shows another embodiment of an LED lamp module according to this invention.

A bulb type LED 204 used in a LED lamp module 203 corresponds to the chip type (rectangular shape) LED 121 used in the LED lamp module 103'. A resistor is not mounted in the LED lamp module 203, but mounted in a junction block, connector, or a junction connector as the embodiments in FIGS. 12 to 18. Further, lead terminals 205 of the LED lamp 204 are used instead of the bus bar 122 in FIG. 11.

The LED lamp module 203 includes a base 206, a cover 207, both forming a case, and being made of synthetic resin, pressure contact terminals 208 surface-mounted on the base 206, the bulb type LED 204 also surface-mounted on the base 206, and a pair of lead terminals 205 of the bulb type LED 204, connected or continued integrally to the pressure contact terminals 208.

The pressure contact terminals 208 and the lead terminals may be separated from each other or formed integrally. If separated, they are connected by such as welding. As the pressure contact terminals 208, a pair of terminals, front and back, are formed integrally, standing up along rib-shape electric wire guides 209 respectively. Electric wires 210 are respectively pressed into contact with two pair of pressure contact terminals 208 corresponding to two lead terminals 205.

Each electric wire 210 is bent by a groove 211 at a side end of the base 206 and extended outward. Structures of the pressure contact terminals 208, the electric wire guide 209, and the electric wire 210 are similar to the embodiment described above.

A substantially semi-circular groove 212 to be engaged with the LED 204 is provided on the base 206. Said groove 212 is surrounded by an outer peripheral wall 213 having a half-nut-like shape. The LED 204 is fit into the groove 212 from above and a top end of the LED 204 is exposed outside. The LED 204 and the pressure contact terminals 208 are surface-mounted at once from above, then the electric wires 210 are pressed into contact with the pressure contact terminals 208. The locking hook 214 for engaging with the cover 207 is formed to stand up on the base 206.

The cover 207 has a substantially same size as the base 206, made of synthetic resin, having a rectangular shape, a inner space to receive the pressure contact terminals 208, the electric wires 210 and the like, a peripheral wall 215 in a half-nut shape surrounding the LED 204, and an engaging concave 216 to be engaged with the locking hook 214.

As shown in FIG. 19, the LED 204 and the pressure contact terminals 208 are surface-mounted on the base 206. After pressing the electric wires 210 into contact with the pressure contact terminals 208, the cover 207 is attached to the base 206 from above. The electric wires 210 are pressed into the grooves 211 of the base 206 to be bent by projections 217, which is formed at the side walls of the cover 207. Thus, strain relief for the electric wires 210 is achieved.

Further, the cover 207 and the base 206 can be rotatably joined together by a hinge (not shown). The shapes of the base 206 and the cover 207 are not limited to a rectangular shape or a box shape, and can be modified properly.

Figure 20:
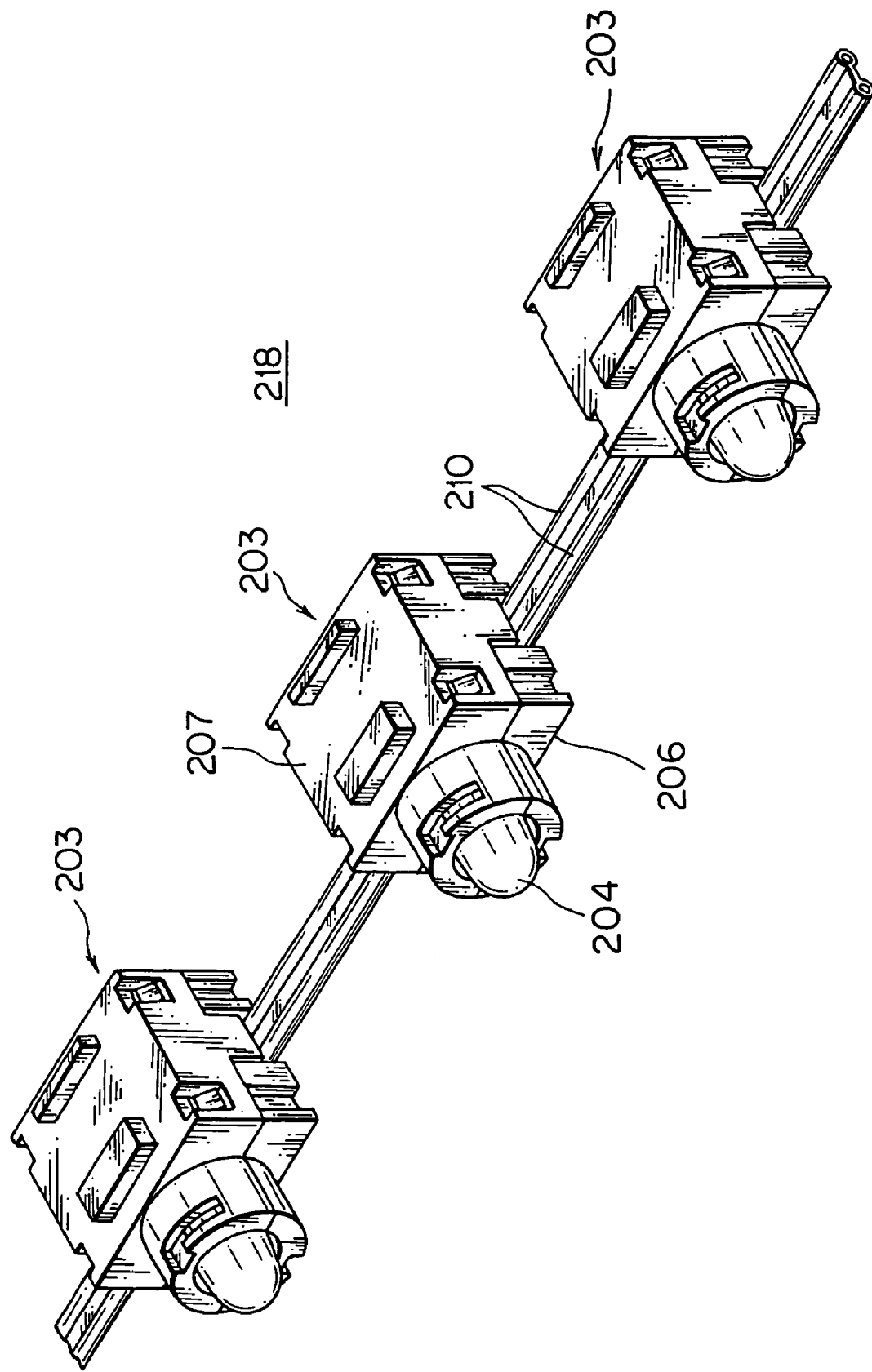
FIG. 20 is a perspective view showing one embodiment of a lamp module assembly using the LED lamp module shown in FIG. 19.

FIG. 20 shows a lamp module assembly 218 having a plurality of LED lamp modules 203 shown in FIG. 19 connected directly to the electric wires without any branch wires. The number of the LED lamp modules 203 is not limited to three. Seven or more LED lamp modules 203 can be arranged.

Figure 21:
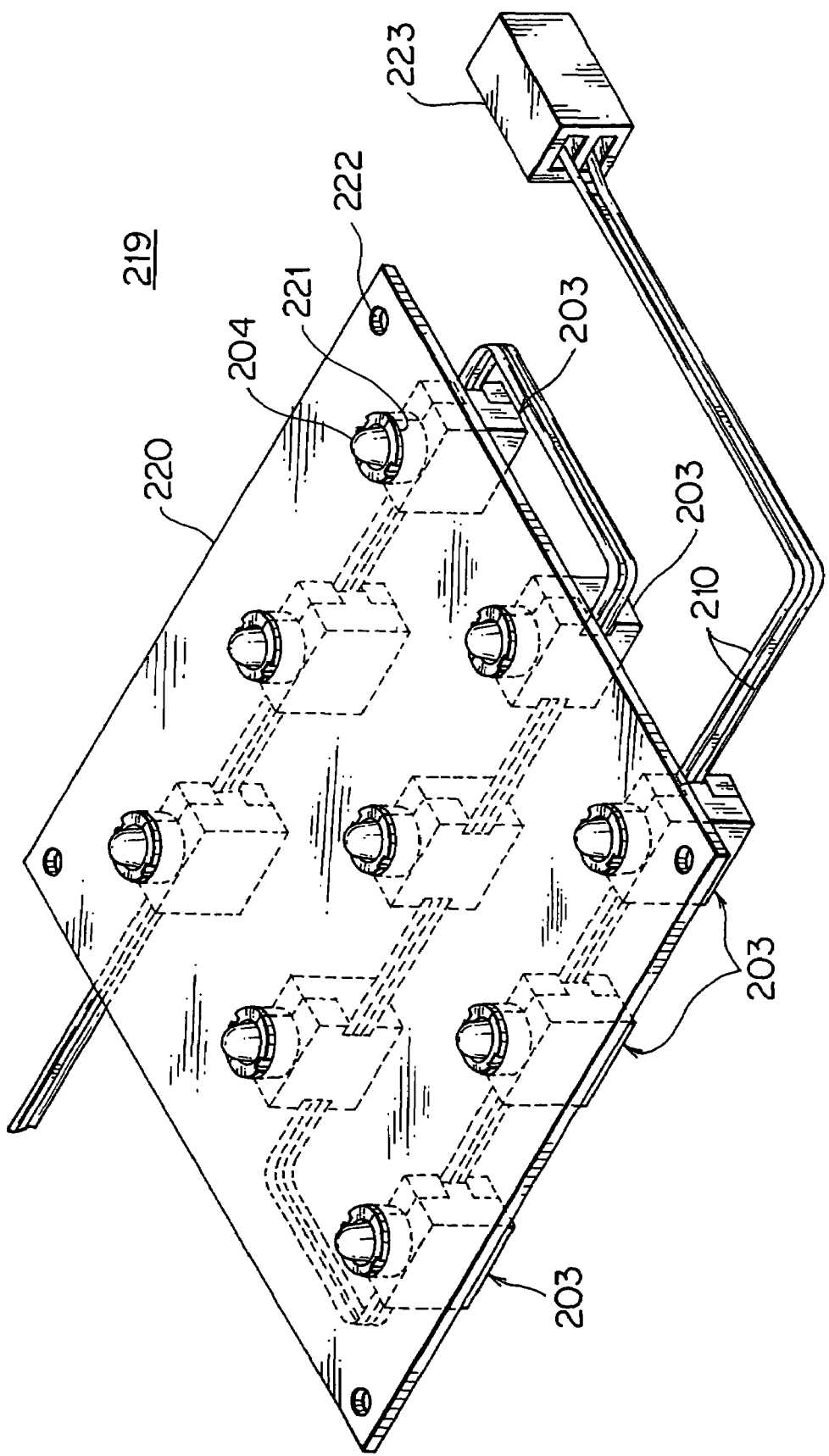
FIG. 21 is a perspective view showing another embodiment of the LED lamp module assembly shown in FIG. 20.

FIG. 21 shows a lamp module assembly 219 formed by connecting a plurality of upright LED lamp modules 203, which are similar to those in FIG. 19, directly to the electric wires 210 without any branch wires, and bending the electric wires 210 in a substantially "Z" shape to arrange them well-ordered two-dimensionally. Thus, this lamp module assembly 219 can be adapted to a rear lamp, a turn signal lamp and the like in a vehicle.

The top end of each LED lamp 204 is, for example, fitted into a hole 221 of a substrate 220 made of transparent synthetic resin and fixed. Fixing holes 222 are provided on the synthetic resin substrate 220 for fixing said substrate to such as a vehicle body.

A plurality of LED lamp modules 203 having the same manner as described above are lined up on the substrate 220 in an extending direction of the electric wires 210.

A connector 223 is formed at one ends of the electric wires 210. A resistor (not shown) as a voltage reducing component is provided in the connector 223, reducing the voltage (such as from 12 volts to 3.5 volts), which is applied to each LED 204. Thus, the LED lamp module 203 can be miniaturized at lower cost. An arrangement and a connection of the resistor in the connector 223 is, for example, achieved by removing the terminal 180 for the lamp bulb from the connector 174 shown in FIG. 14.

INDUSTRIAL APPLICABILITY

According to this invention as described in claim 1 like above, the coupling portion of the base of the lower LED lamp module is engaged with the mating coupling portion of the cover of the lower LED lamp module to couple the upper and lower LED lamp modules together. Thus, the intensity of the LED illumination device can be adjusted by increasing or decreasing the number of the LED lamp modules.

Therefore, the LED illumination device can be miniaturized and standardized. Further, design flexibility of the LED illumination device is improved.

Further, according to this invention as described in claim 2, the upper and lower LED lamp modules are connected together by engaging the locking arm of the upper LED lamp module with the locking frame of the lower LED lamp module.

For decoupling these modules from each other, while the locking arm of the upper LED lamp module is bent outward, the upper and lower LED lamp modules are removed from each other. Thus, the upper locking arm and the lower frame are disengaged with each other to separate the upper and lower LED lamp modules.

Therefore, according to this invention, the LED lamp modules 34 can be easily coupled with and removed from each other.

Further, according to this invention as described in claim 3, since the locking frame is curved inward, when coupling the base and the cover, the locking frame may not block the locking arm to prevent the locking frame and the locking arm from interfering with each other.

Therefore, the locking arm is prevented from being flattened or damaged and the LED lamp modules coupling with each other can be prevented from being removed unintentionally.

Further, according to this invention as described in claim 4, a guide rib is formed on a ceiling wall of the cover to straighten the curved locking frame when coupling the cover and the base together. Therefore, when coupling the cover to the base, the curved locking frame is straightened upward by the guide rib to stand upright on the base.

Further, according to this invention as described in claim 5, since a locking part for locking the cover to be coupled is formed on the base, and a mating locking part is formed on the cover, by engaging between the coupling portion and the mating coupling portion, and engaging between the locking part and the mating locking part, the cover is doubly prevented from uncovering the base. Thus, reliability of electric connectivity of the LED illumination device is maintained.

According to this invention as described in claim 6, the conductive circuit, the LED, the electric wires and the like are easily and efficiently mounted, for example surface-mounted, on the base while the cover is open. Therefore, regarding the LED lamp module, an assembling ability is improved, its cost is reduced, and its quality is improved.

According to this invention as described in claim 7, for example, the conductive circuit, the chip type LED, or the bullet type LED are further easily, efficiently and reliably surface-mounted on the base. Therefore, the assembling ability is improved.

According to this invention as described in claim 8, by pressing the electric wire into contact, the electric wires and conductive circuits can be easily and reliably connected to each other with a few man-hours.

According to this invention as described in claim 9, the number of the LED lamp modules can be easily increased in increments of an LED lamp module. Therefore, the Lamp module assembly can easily cope with a specification of such as illumination intensity.

According to this invention as described in claim 10, a resistor for example, is arranged in the junction box or the junction connector for reducing the voltage supplied to the LED of each LED lamp module collectively from the power source. Thus, the LED lamp module can be simplified, miniaturized and at lower cost owing to reduction of the number of the resistors. Thus, a compact Lamp module assembly is provided to be mounted in a narrow space in such as a vehicle.

According to this invention as described in claim 11, a resistor, for example, is arranged in the connector for reducing collectively the voltage supplied to the LED of each LED lamp module from the power supply. Thus, the LED lamp module can be simplified, miniaturized and at lower cost owing to reduction of the number of the resistors. Thus, a compact Lamp module assembly is provided to be mounted in a narrow space in such as a vehicle.

According to this invention as described in claim 12, a resistor for example, is arranged in the junction box or the junction connector for reducing the voltage supplied to the LED of each LED lamp module collectively from the power source. Thus, the LED lamp module can be simplified, miniaturized and at lower cost owing to reduction of the number of the resistors. Thus, a compact Lamp module assembly is provided to be mounted in a narrow space in such as a vehicle.

According to this invention as described in claim 13, a resistor, for example, is arranged in the connector for reducing collectively the voltage supplied to the LED of each LED lamp module from the power supply. Thus, the LED lamp module can be simplified, miniaturized and at lower cost owing to reduction of the number of the resistors. Thus, a compact Lamp module assembly is provided to be mounted in a narrow space in such as a vehicle.

According to the present invention as described in claim 14, the connector can be easily and efficiently assembled to reduce the cost of the Lamp module assembly. Further, by directly mounting the bus bar and the resistor on the base without a circuit board, the connector can be miniaturized at lower cost.

According to this invention as described in claim 15, for example, the low voltage LED lamp and the power supply voltage bulb lamp can be mounted in the same module. Therefore, a lamp module specification becomes diversified.

The invention claimed is:

1. An LED illumination device comprising LED lamp modules coupled in a vertical direction, each LED lamp module comprising:
    a base;
    a conductive circuit formed on the base; and
    a cover to be attached to the base to cover the conductive circuit,
    whereby a coupling portion is formed on said base to be coupled with the cover of the LED lamp module located at the upper side thereof, and a mating coupling portion is formed on said cover to be coupled with the coupling portion of the base of the LED lamp module located at the lower side thereof for coupling one LED lamp module to another LED lamp module in a vertical direction.

2. An LED illumination device comprising LED lamp modules coupled in a vertical direction, each LED lamp module comprising:
    a base;
    a conductive circuit formed on the base; and
    a cover to be attached to the base to cover the conductive circuit, whereby a coupling portion is formed on said base to be coupled with the cover of the LED lamp module located at the upper side thereof, and a mating coupling portion is formed on said cover to be coupled with the coupling portion of the base of the LED lamp module located at the lower side thereof.

wherein said coupling portion is a locking frame projecting upward, and said mating coupling portion is a locking arm having a hook at its distal end and projecting downward to be engaged with said locking frame, and wherein one guide, into which said locking arm is inserted, is formed on said base near the locking frame, and the other guide, into which said locking frame is inserted, is formed on the cover near the locking arm.

3. The LED illumination device as recited in claim 2, wherein said locking frame is curved inward.

4. The LED illumination device as recited in claim 3, wherein a guide rib is formed on a celing wall of the cover to straighten the curved locking frame when coupling the cover and the bas to each other.

5. An LED illumination device in comprising LED lamp modules coupled in a vertical direction, each LED lamp module comprising:
a base;
a conductive circuit formed on the base;
a cover to be attached to the base to cover the conductive circuit,
whereby a coupling portion is formed on said base to be coupled with the cover of the LED lamp module located at the upper side thereof, and a mating coupling portion is formed on said cover to be coupled with the coupling portion of the base of the LED lamn module located at the lower side thereof,
wherein a locking part for locking the coupled cover is formed on the base, and
a mating locking part is formed on the cover to be engaged with said locking part.

6. An LED lamp module comprising:
an insulating case having a base and a cover;
a conductive circuit provided at said base;
an LED mounted on the base and electrically connected to the conductive circuit; and
electric wirejoints provided respectively upstream and downstream of the conductive circuit.

7. The LED lamp module as recited in claim 6, wherein said conductive circuit is a bus bar or a lead terminal.

8. The LED lamp module as recited in claim 6, wherein said electric wire joint is a pressure contact terminal.

9. A lamp module assembly comprising a plurality of said LED lamp modules as recited in claim 6,
wherein electric wires are directly connected to respective electric wire joints of the LED lamp modules without any branch wires.

10. The lamp module assembly as recited in claim 9,
wherein said electric wires are wired to a junction box or a junction connector, and
wherein an electric component for reducing voltage applied to said LED lamp modules is provided on the junction box or the junction connector.

11. The lamp module assembly as recited in claim 9,
wherein said electric wires are wired to a junction box, a junction connector or other circuits through an electrical connector; and
an electric component for reducing voltage applied to said LED lamp modules is provided on said electrical connector.

12. A lamp module assembly comprising:
a plurality of LED lamp modules;
electric wires being connected directly to the LED lamp modules without any branch wires, and wired to a junction box or a junction connector; and
an electric component provided on said junction box or said junction connector for reducing voltage applied to said LED lamp modules.

13. A lamp module assembly comprising:
a plurality of LED lamp modules;
electric wires connected directly to the lamp module assembly without any branch wires;
an electrical connector, through which said electric wires being wired to a junction box, a junction connector, or other circuits; and
an electric component provided on said electrical connector for reducing voltage applied to said LED lamp modules.

14. The lamp module assembly as recited in claim 11,
wherein said electrical connector includes a base and a cover, said base having a bus bar, and said electric component for reducing applied voltage connected to said bus bar, said bus bar having connector terminals and being connected to electric wires.

15. The lamp module assembly as recited in claim 14,
wherein one positive terminal of said connector terminals of the bus bar is connected to one terminal of said electric component for reducing applied voltage from a voltage source, the other positive terminal of said connector terminals is connected to an anode of a voltage source, and a negative terminal of said connector terminals is connected to a ground of the voltage source.

16. The lamp module assembly as recited in claim 13,
wherein said electrical connector includes a base and a cover, said base having a bus bar, and said electric component for reducing applied voltage connected to said bus bar, said bus bar having connector terminals and being connected to electric wires.

* * * * *